(12) United States Patent
He et al.

(10) Patent No.: US 11,528,903 B1
(45) Date of Patent: Dec. 20, 2022

(54) ISCHAEMIA-FREE ORGAN PERFUSION DEVICE AND PERFUSION METHOD

(71) Applicant: THE FIRST AFFILIATED HOSPITAL, SUN YAT-SEN UNIVERSITY, Guangdong (CN)

(72) Inventors: Xiaoshun He, Guangdong (CN); Qiang Zhao, Guangdong (CN); Jinbo Huang, Guangdong (CN); Honghui Chen, Guangdong (CN); Zhiyong Guo, Guangdong (CN)

(73) Assignee: THE FIRST AFFILIATED HOSPITAL, SUN YAT-SEN UNIVERSITY, Guangdong (CN)

(*) Notice: Subject to any disclaimer, the term of this patent is extended or adjusted under 35 U.S.C. 154(b) by 0 days.

(21) Appl. No.: 17/575,505

(22) Filed: Jan. 13, 2022

(30) Foreign Application Priority Data

Aug. 2, 2021 (CN) .......................... 202110881747.2

(51) Int. Cl.
*A01N 1/02* (2006.01)

(52) U.S. Cl.
CPC ........... *A01N 1/0247* (2013.01); *A01N 1/021* (2013.01); *A01N 1/0242* (2013.01)

(58) Field of Classification Search
None
See application file for complete search history.

(56) References Cited

U.S. PATENT DOCUMENTS

| 6,046,046 | A | * | 4/2000 | Hassanein | ................ | A01N 1/02 |
| | | | | | | 435/284.1 |
| 10,278,384 | B2 | * | 5/2019 | Tillman | .............. | A61M 1/3659 |
| 2014/0220550 | A1 | | 8/2014 | van der Plaats et al. | | |
| 2015/0289499 | A1 | | 10/2015 | Tsuji et al. | | |
| 2020/0108109 | A1 | | 4/2020 | Bishawi et al. | | |
| 2020/0375178 | A1 | * | 12/2020 | Becker | ................ | A01N 1/0226 |

FOREIGN PATENT DOCUMENTS

| CN | 1320014 | A | 10/2001 |
| CN | 108432743 | A | 8/2018 |
| CN | 109362710 | A | 2/2019 |
| CN | 109511649 | A | 3/2019 |
| CN | 209711249 | U | 12/2019 |
| CN | 111869657 | A | 11/2020 |
| CN | 112244007 | A | 1/2021 |
| CN | 2021108817472 | | 7/2021 |
| CN | 113396898 | A | 9/2021 |
| CN | 113396898 | B | 11/2021 |
| JP | H03151302 | A | 6/1991 |
| WO | 2007111495 | A1 | 10/2007 |

* cited by examiner

Primary Examiner — William H. Beisner
(74) Attorney, Agent, or Firm — D'Ambrosio & Menon, PLLC; Usha Menon

(57) ABSTRACT

Disclosed is an ischaemia-free organ perfusion device and perfusion method. The perfusion device perfuses an isolated organ at normal temperature during whole transplantation, and comprises a first container, a second container, a first flow path, a second flow path, a third flow path and a fourth flow path. The perfusion device and the perfusion method are capable of maintaining the blood flow of the isolated organ during whole transplantation without interruption by machine perfusion, recovering the blood of the organ, effectively avoiding the interruption of blood supply for the organ during the whole transplantation, and improving the prognosis of organ transplantation.

10 Claims, 10 Drawing Sheets

ISCHAEMIA-FREE ORGAN PERFUSION DEVICE AND PERFUSION METHOD

CROSS REFERENCE TO RELATED APPLICATION

This application claims the benefit of CN patent application No. 202110881747.2 filed on Aug. 2, 2021, the entire disclosures of which are hereby incorporated herein by reference.

TECHNICAL FIELD

The present invention relates to the field of medical apparatus and instruments, and more particularly, to an ischaemia-free organ perfusion device and a perfusion method.

BACKGROUND

Organ transplantation is a gold standard for the treatment of end-stage organ diseases. Under an existing technical system of organ transplantation, an organ suffers from blood supply interruption for a long time from acquisition from a donor to transplantation to a patient, and an ischemia injury of the organ is inevitable, which runs through a whole process of organ acquisition, preservation and implantation. An organ ischemia-reperfusion injury is the most important factor affecting the prognosis of transplantation, which may lead to primary graft failure (incidence of 6%), early graft dysfunction (incidence of 43.8%), ischemic biliary disease (incidence of 9%) and post-reperfusion syndrome (incidence of 53.6%) after operation, and a one-year survival rate of patients is only 84.6%. Since the advent of organ transplantation technology, scientists around the world have focused on how to reduce an organ ischemia injury, but all of effort, including the use of drugs, ischemia pretreatment, gene therapy and cell therapy, have brought little effect. The "congenital defect" of the organ transplantation has never been fundamentally solved.

Under a traditional transplantation technology system, it is still the most important way to preserve an isolated organ by low temperature soaking with a preservation solution. A low temperature may cause damage to the isolated organ, and more importantly, the blood flow of the organ is completely interrupted. After the organ preserved at the low temperature is transplanted to a recipient, blood supply needs to be restored, and the transplanted organ inevitably suffers from the ischemia-reperfusion injury, which causes serious damage to the transplanted organ, having great impact on the prognosis of organ transplantation and the short-term and long-term survival of patients.

One of leading and hot technologies in the field of organ transplantation is normothermic machine perfusion technology. The instrument may simulate a human body to supply blood and nutrition for the organ in vitro for the purpose of maintaining the function and vitality of the organ in an "isolated state" for a long time. The mechanical perfusion technology, as a more effective organ preservation method, has found an increasingly wide utilization in the field of organ transplantation. Patent application CN202010823535.4 discloses an isolated liver perfusion system, a joint tube assembly and a connecting method thereof, patent application CN201811392862.8 discloses a normothermic machine perfusion system capable of extending a liver source, and patent application CN201811432911.6 discloses a liver perfusion device. In systems designed in these patents, an isolated liver starts to be perfused by normothermic machine perfusion. However, existing normothermic machine perfusion device only solves a problem of organ ischemia during isolated organ preservation, but the blood supply for the organ may still be interrupted in a process from acquiring the organ from the donor to accessing blood vessels of the organ to the normothermic machine perfusion device, as well as in a process from taking the organ from the normothermic machine perfusion device to implanting the organ to the recipient, and the organ even suffers from ischemia attacks twice, which significantly affects the prognosis of transplantation. There is no appropriate patent solution by far.

SUMMARY

The present invention is intended to solve the technical problems in the prior art, and provides a device for organ perfusion without interrupting blood flow, which effectively avoids interruption of blood supply for an organ during whole organ transplantation (organ acquisition—isolated perfusion—implantation to recipient), and greatly improves prognosis of organ transplantation.

The present invention further provides a method for perfusion without interrupting blood flow by using the above organ perfusion device.

An ischaemia-free organ perfusion device according to an embodiment of a first aspect of the present invention comprises:

a first container for storing an isolated organ, wherein the first container is provided with a first perfusion port, a second perfusion port and a third perfusion port;

a second container for storing perfusate, wherein the second container is provided with a first port and a second port;

a first flow path comprising
  a first branch, wherein the first branch is configured for communicating the first perfusion port with the first port, and is provided with a first pump configured for flowing the perfusate from the first port to the first perfusion port, and
  a second branch, wherein the second branch is configured for communicating the second perfusion port with the first port, and is provided with a second pump configured for flowing the perfusate from the first port to the second perfusion port, a second flow path for communicating the third perfusion port with the second port;

a third flow path for communicating an organ in donor acquisition stage with the first port;

a fourth flow path for communicating the organ in donor acquisition stage with the second port, wherein the second container, the third flow path and the fourth flow path are capable of forming a second circulation with the organ in donor acquisition stage to perfuse the organ in donor acquisition stage, and after the organ is isolated, the second circulation is capable of being switched to a first circulation formed by the second container, the first flow path, the second flow path and the isolated organ in the first container is capable of being switched to perfuse the isolated organ in preservation stage, and a third pump for providing power to the second circulation;

wherein uninterrupted blood supply for the transplanted organ during whole organ transplantation is maintained by normothermic machine perfusion.

The ischaemia-free organ perfusion device according to the embodiment of the present invention at least has the following beneficial effects: the perfusion device can be respectively communicated with organs in each treatment stages through different flow paths, so as to recover the blood of a donor, improve the utilization of the blood effectively, and perfuse the transplanted organ continuously and uninterruptedly, which effectively avoids the interruption of blood supply for the organ, and then improve the prognosis of organ transplantation.

According to some embodiments of the present invention, the ischaemia-free organ perfusion device further comprises an oxygenator and a unidirectional flow regulating valve, wherein the first flow path further comprises a third branch, the oxygenator is arranged in the second branch, the third branch communicates the first branch with the second branch, and the third branch is provided with the unidirectional flow regulating valve which is configured for making the perfusate flowing through the oxygenator flow unidirectionally into the first branch through the third branch.

According to some embodiments of the present invention, the ischaemia-free organ perfusion device further comprises an organ evaluation system, wherein the organ evaluation system includes an organ evaluation computer system, a blood gas detection system and an imager, the blood gas detection system is configured for detecting blood gas of the perfusate in the first flow path and the second flow path, the imager is configured for capturing image of the organ in the first container, and the organ evaluation computer system is configured for receiving signals from the blood gas detection system and the imager, and evaluating a condition of the isolated organ.

According to some embodiments of the present invention, the ischaemia-free organ perfusion device further comprises a control system, wherein the control system is configured for regulating the unidirectional flow regulating valve according to oxygen saturation of the perfusate in the first branch detected by the blood gas detection system.

According to some embodiments of the present invention, the ischaemia-free organ perfusion device further comprises a secretion collector, a fifth flow path, and a secretion outlet arranged in the first container, wherein the secretion outlet is communicated with the secretion collector through the fifth flow path, and the organ evaluation computer system is capable of analyzing secretion to evaluate the condition of the isolated organ.

According to some embodiments of the present invention, the ischaemia-free organ perfusion device further comprises a pressure detection assembly arranged in the first branch and the second branch, and a control system, wherein the control system is configured for regulating a flow rate of the first pump according to a perfusion pressure of the first branch and regulating a flow rate of the second pump according to a perfusion pressure of the second branch.

According to some embodiments of the present invention, the pressure detection assembly comprises a three-way plug valve, a first detection tube, a second detection tube, a first pressure sensor and a second pressure sensor, one end of the three-way plug valve is communicated with the corresponding branch of the first flow path, the other two ends of the three-way plug valve are respectively connected with the first detection tube and the second detection tube, the first pressure sensor is configured for detecting pressure of the first detection tube, the second pressure sensor is configured for detecting pressure of the second detection tube, a height difference between the first pressure sensor and the corresponding perfusion port is the same as that between the second pressure sensor and the corresponding perfusion port, the three-way plug valve is capable of being switched to a detection state that the first detection tube is communicated with the corresponding branch and the second detection tube is disconnected from the corresponding branch.

According to some embodiments of the present invention, the ischaemia-free organ perfusion device further comprises a doser and a control system, wherein the doser is configured for injecting a medicament into the first flow path, and the control system controls the doser according to pH value or $HCO^{3-}$ value of the perfusate in the first flow path detected by the blood gas detection system.

According to some embodiments of the present invention, the ischaemia-free organ perfusion device further comprises a control system, a temperature sensor arranged in the second container, and a heat preservation system arranged in the second container, wherein the control system is configured for regulating operation of the heat preservation system according to a detection value of the temperature sensor, so that a temperature of the perfusate in the second container is maintained within a set range.

According to some embodiments of the present invention, the ischaemia-free organ perfusion device further comprises a control system, a liquid supplementing device, a liquid level sensor, an osmotic pressure sensor, and a liquid injection port arranged in the second container, wherein the liquid level sensor is configured for detecting a liquid level height of the second container, the osmotic pressure sensor is arranged at a bottom portion of the second container, and the control system is configured for controlling the liquid supplementing device according to data from the liquid level sensor and the osmotic pressure sensor, so that a solution in the liquid supplementing device is injected into the second container through the liquid injection port.

According to some embodiments of the present invention, the ischaemia-free organ perfusion device further comprises a plurality of lifting columns arranged at a bottom portion of the first container, and the plurality of lifting columns are capable of being lifted in a cross manner.

An ischaemia-free organ perfusion method according to an embodiment of a second aspect of the present invention by using the ischaemia-free organ perfusion device according to the embodiment of the first aspect above, and comprises:

(1) inserting a puncture catheter head of a venipuncture catheter into a first vein of an organ in donor acquisition stage, communicating a venous catheter lumen of the venipuncture catheter with the third flow path, and communicating an auxiliary catheter lumen of the venipuncture catheter with the fourth flow path to establish the second circulation, wherein the perfusate in the second container enters the organ in donor acquisition stage through the third flow path and the venous catheter lumen, and meanwhile, the blood in the organ in donor acquisition stage enters the second container through the auxiliary catheter lumen and the fourth flow path;

(2) inserting one end of a first puncture catheter into an artery of the organ in donor acquisition stage, connecting the other end of the first puncture catheter with the second perfusion port to establish a third circulation among the first container, the fourth flow path, the third pump, the second branch and the organ in donor acquisition stage, so that the blood in the organ enters the second container through the fourth flow path, and the perfusate in the second container is perfused into the artery of the organ;

(3) inserting one end of a second puncture catheter into a second vein of the organ in donor acquisition stage, and connecting the other end of the second puncture catheter with the first perfusion port, so that the perfusate in the second container is perfused into the second vein of the organ; and after the blood of the organ in donor acquisition stage is recovered, closing the fourth flow path; and (4) fully dissociating a connected part between the organ and the donor, placing the organ in the first container, closing the third flow path, cutting off the venipuncture catheter, and inserting a free end of a part of the venipuncture catheter communicated with the organ into the third perfusion port to form the first circulation by the first container, the second container, the first flow path and the second flow path.

The ischaemia-free organ perfusion method according to the embodiment of the present invention at least has the following beneficial effects: stable blood supply is ensured at different time by puncturing the arteries and veins of the organ respectively, so that the blood supply for the organ can be steadily maintained, and then the functionality of the organ is improved.

According to some embodiments of the present invention, a first sensor is arranged in the first puncture catheter, a second sensor is arranged in the second puncture catheter, and in the stage of acquiring the organ from the donor, hemodynamic parameters of the artery are collected by the first sensor, and hemodynamic parameters of the second vein are collected by the second sensor; and during the first circulation, the first pump is operated based on the parameters collected by the second sensor, and the second pump is operated based on the data collected by the first sensor.

According to some embodiments of the present invention, a third sensor is arranged in the venipuncture catheter, in the stage of acquiring the organ from the donor, hemodynamic parameters of the first vein are detected by the third sensor, and during the first circulation, the third pump is operated based on the parameters collected by the third sensor.

Part of the additional aspects and advantages of the present invention will be given in part in the following description, and will become apparent in part from the following description, or will be learned through the practice of the present invention.

BRIEF DESCRIPTION OF THE DRAWINGS

The present invention is further described hereinafter with reference to the accompanying drawings and the embodiments, wherein.

REFERENCE NUMERALS

Figure 1:
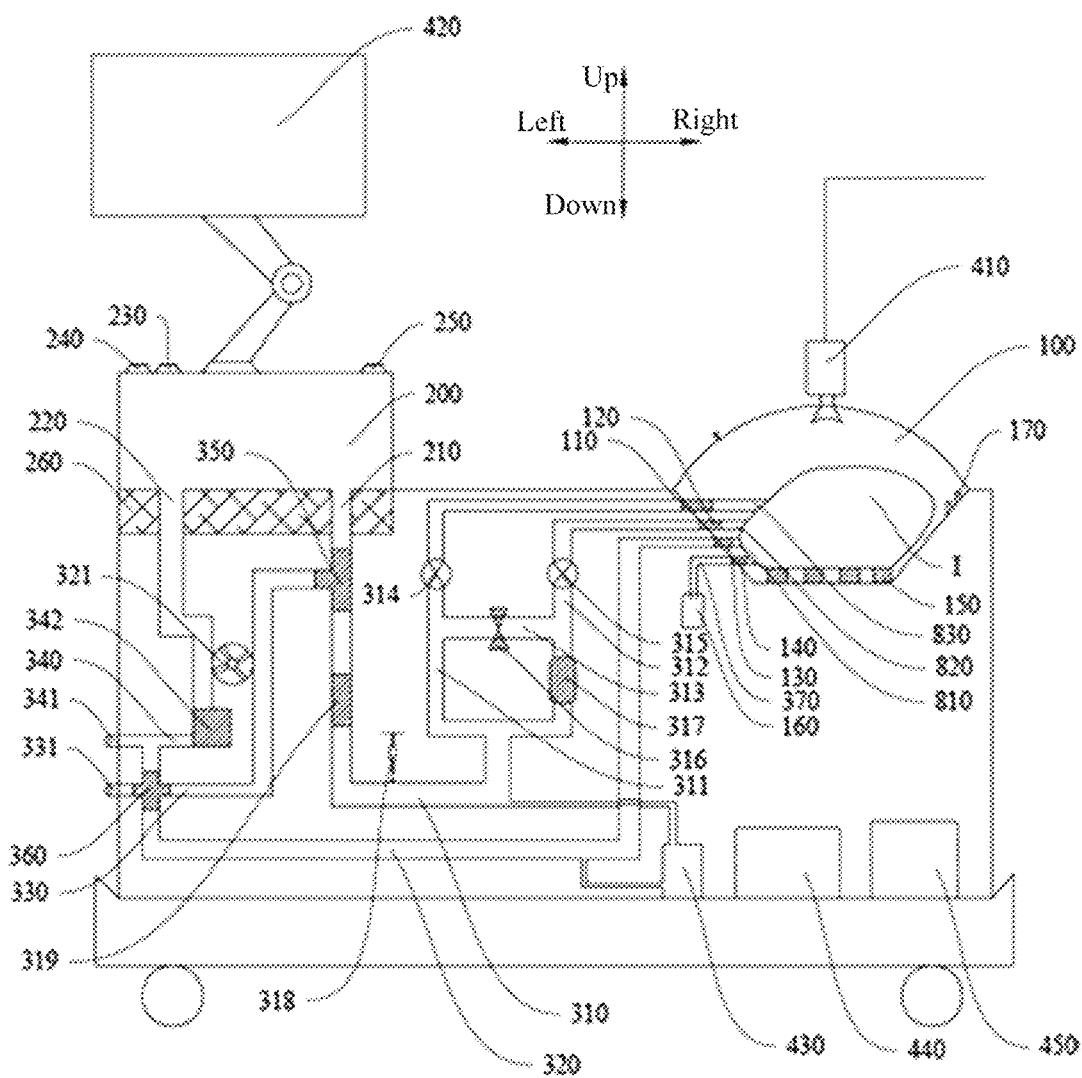
FIG. 1 is a schematic structural diagram that an ischaemia-free organ perfusion device perfuses an isolated organ according to an embodiment of the present invention.

100 refers to first container, 110 refers to first perfusion port, 120 refers to second perfusion port, 130 refers to third perfusion port, 140 refers to secretion outlet, 150 refers to lifting column, 160 refers to secretion collector, 170 refers to spray jet, 200 refers to second container, 210 refers to first port, 220 refers to second port, 230 refers to liquid injection port, 240 refers to gas inlet, 250 refer to gas outlet, 260 refers to heat preservation system, 310 refers to first flow path, 311 refers to first branch, 312 refers to second branch, 313 refers to third branch, 314 refers to first pump, 315 refers to second pump, 316 refers to unidirectional flow regulating valve, 317 refers to oxygenator, 318 refers to doser, 319 refers to thrombus filter, 320 refers to second flow path, 321 refers to third pump, 330 refers to third flow path, 331 refers to first plug-in port, 340 refers to fourth flow path, 341 refers to second plug-in port, 342 refers to leukocyte filter, 350 refers to three-way valve, 360 refers to four-way valve, 370 refers to fifth flow path, 410 refers to imager, 420 refers to displayer, 430 refers to blood gas detection system, 440 refers to organ evaluation computer system, 450 refers to control system, 500 refers to venipuncture catheter, 510 refers to puncture catheter head, 520 refers to venous catheter lumen, 530 refers to auxiliary catheter lumen, 540 refers to upper balloon, 550 refers to lower balloon, 560 refers to second balloon tubule, 600 refers to first puncture catheter, 610 refers to lumen, 620 refers to first balloon tubule, 630 refers to balloon, 710 refers to three-way plug valve, 720 refers to first detection pipeline, 730 refers to first pressure sensor, 740 refers to second detection pipeline, 750 refers to second pressure sensor, 810 refers to inferior vena cava, 820 refers to splenic/gastroduodenal artery, 830 refers to portal vein, I refers to isolated organ, and II refers to organ in donor acquisition stage.

DETAILED DESCRIPTION

The embodiments of the present invention will be described in detail hereinafter. Examples of the embodiments are shown in the accompanying drawings. The same or similar reference numerals throughout the drawings denote the same or similar elements or elements having the same or similar functions. The embodiments described below with reference to the accompanying drawings are exemplary and are only intended to explain the present invention, but shall not be construed as limiting the present invention.

In the description of the present invention, it shall be understood that the orientation or position relation related to the orientation description, such as the orientation or position relation indicated by upper, lower, front, rear, left, right, etc., is based on the orientation or position relation shown in the drawings, which is only for the convenience of description of the present invention and for the simplification of description instead of indicating or implying that the indicated device or element must have a specific orientation, or be constructed and operated in a specific orientation, and thus shall not be understood as a limitation to the present invention.

In the description of the present invention, the term "several" refers to be more than one, and the term "a plurality of refers to be more than two. The terms" greater than", "less than", "more than", etc., are understood as not including the indicated number, while the terms "above", "below", "within", etc., are understood as including the indicated number. The description of" "first" or "second" is only for the purpose of distinguishing technical features, and shall not be understood as indicating or implying relative importance, implicitly indicating the number or the order of the indicated technical features.

In the description of the present invention, unless otherwise clearly defined, words such as "configured", "arranged", "connected", etc., shall be understood broadly, and those skilled the art can reasonably determine the specific meanings of the above words in the present invention in combination with the specific contents of the technical solution.

In the description of the present invention, the descriptions of the reference terms "one embodiment", "some embodiments", "schematic embodiments", "examples", "specific examples", or "some examples" refer to that the specific features, structures, materials, or characteristics described in combination with the embodiment or example are included in at least one embodiment or example of the present invention. In the specification, the schematic representation of the above terms does not necessarily mean the same embodiment or example. Moreover, the specific features, structures, materials or characteristics described may be combined in any one or more embodiments or examples in a suitable manner.

An ischaemia-free organ perfusion device according to an embodiment of a first aspect of the present invention is described hereinafter with reference to the accompanying drawings. The ischaemia-free organ perfusion device according to the present invention is useful for assisting in the whole process of ischemia-free organ transplantation. The perfusion device includes a first container 100, a second container 200, a first flow path 310, a second flow path 320, a third flow path 330 and a fourth flow path 340. The first container 100 is configured for storing an isolated organ I, and the first container 100 is provided with a first perfusion port 110, a second perfusion port 120 and a third perfusion port 130. The second container 200 is configured for storing perfusate, and the second container 200 is provided with a first port 210 and a second port 220. The first flow path 310 has a first branch 311 and a second branch 312. The first branch 311 is configured for communicating the first perfusion port 110 with the first port 210, and the second branch 312 is configured for communicating the second perfusion port 120 with the first port 210. The first branch 311 is provided with a first pump 314, and the first pump 314 is configured for making the perfusate flow from the first port 210 to the first perfusion port 110. The second branch 312 is provided with a second pump 315, and the second pump 315 is configured for making the perfusate flow from the first port 210 to the second perfusion port 120. The second flow path 320 is configured for communicating the third perfusion port 130 with the second port 220. The third flow path 330 is configured for communicating an organ in donor acquisition stage II with the first port 210. The fourth flow path 340 is configured for communicating the organ in donor acquisition stage II with the second port 220. The second container 200, the third flow path 330 and the fourth flow path 340 are capable of forming a second circulation with the organ in donor acquisition stage to perfuse the organ in donor acquisition stage, and after the organ is isolated, the second circulation is capable of being switched to a first circulation formed by the second container, the first flow path, the second flow path and the isolated organ in the first container to perfuse the isolated organ in preservation stage. The third pump is configured for providing power to the second circulation.

Figure 2:
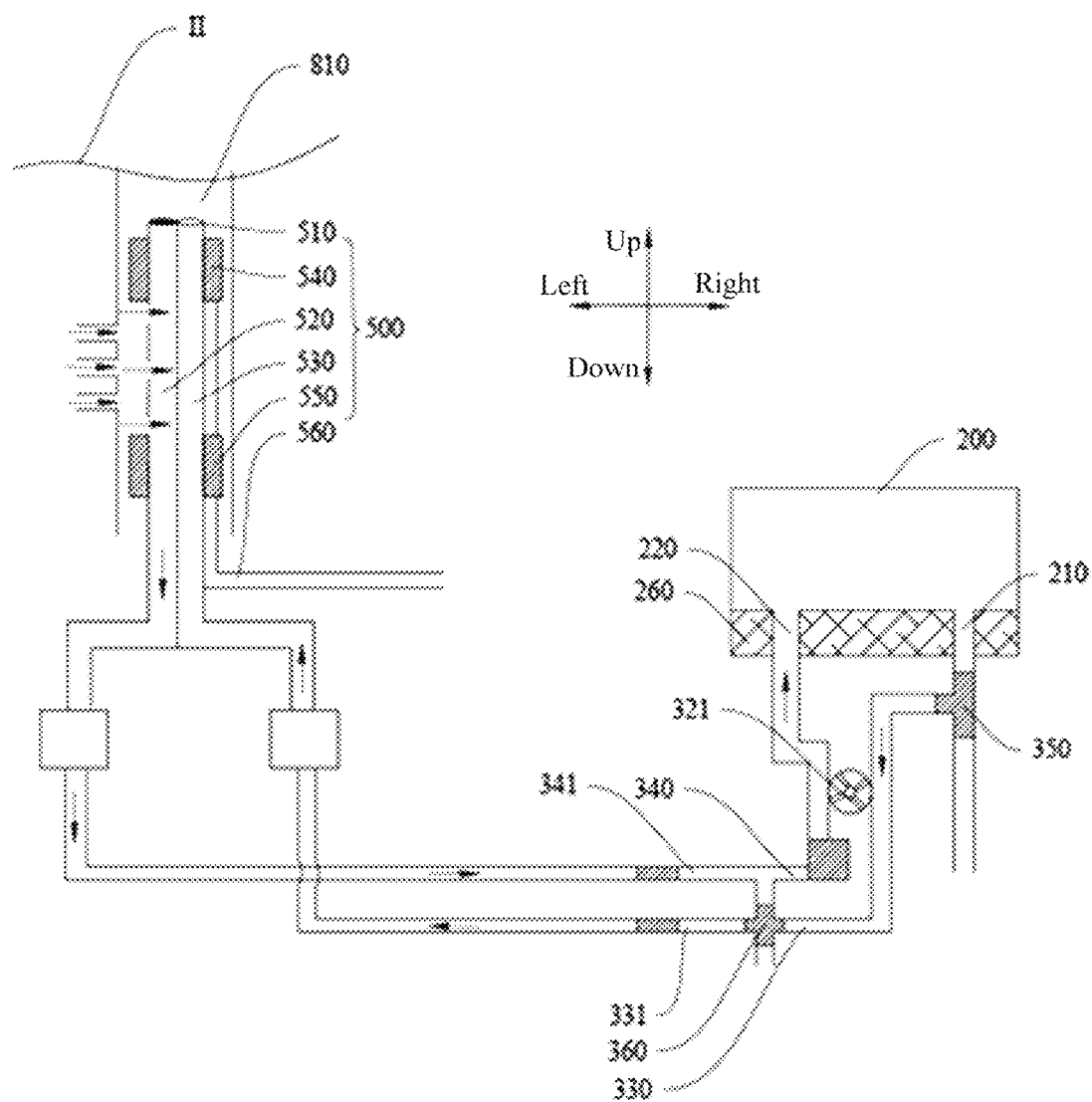
FIG. 2 is a schematic structural diagram that the ischaemia-free organ perfusion device establishes a circulation with an inferior vena cava of a donor in an acquisition stage according to an embodiment of the present invention.

A structure and an operating mode of the perfusion device are introduced by taking a liver as an example, wherein the whole process of organ transplantation fundamentally comprises acquisition of the organ from the donor, preservation of the isolated organ, and implantation of the isolated organ to a recipient. After the perfusion device is connected with the organ in donor acquisition stage through the catheter, the second circulation is established for perfusing the organ in donor acquisition stage. As shown in FIG. 2, an end of the third flow path 330 of the perfusion device is provided with a first plug-in port 331, and an end of the fourth flow path 340 of the perfusion device is provided with a second plug-in port 341. A puncture catheter head 510 (namely an end where an auxiliary catheter lumen 530 and a venous catheter lumen 520 are combined together) of a venipuncture catheter 500 is inserted into an inferior vena cava 810 of a donor. One end of the auxiliary catheter lumen 530 of the venipuncture catheter 500 far away from the liver is connected with the first plug-in port 331 of the perfusion device, and one end of the venous catheter lumen 520 of the venipuncture catheter 500 far away from the liver is connected with the second plug-in port 341 of the perfusion device. By this way, the second circulation is established with the organ in donor acquisition stage II being connected with the second container 200 of the perfusion device. 1000 mL of perfusate (containing an antibiotic, heparin and other ingredients) is placed in the second container 200, and under the drive of the third pump 321, the perfusate in the second container 200 flows out from the first port 210, enters the auxiliary catheter lumen 530 through the first plug-in port 331 (namely the third flow path 330), and then enters the inferior vena cava in donor acquisition stage. An equal volume of blood of the donor flows into the venous catheter lumen 520 from a side wall of the venous catheter lumen 520 (an upper end of the venous catheter lumen 520 is a closed end, so that the blood of the donor enters the venous catheter lumen 520 through the side wall of the venous catheter lumen 520), while the perfusate is injected into the inferior vena cava 810 of the donor. The blood flows out through the venous catheter lumen 520, flows through the second plug-in port 341, and flows into the second container 200 through the second port 220 (namely the fourth flow path 340), so that the isotonic perfusate in the second container 200 has red blood cell ingredient carrying oxygen. In the circulation (namely the second circulation), a peristaltic pump may be selected as the third pump 321, and the peristaltic pump simultaneously acts on the third flow path and the fourth flow path, thus providing power for the perfusate to enter the inferior vena cava 810, and simultaneously providing power for the blood of the donor to flow back into the second container 200, so as to ensure a reliability of the second circulation.

Figure 3:
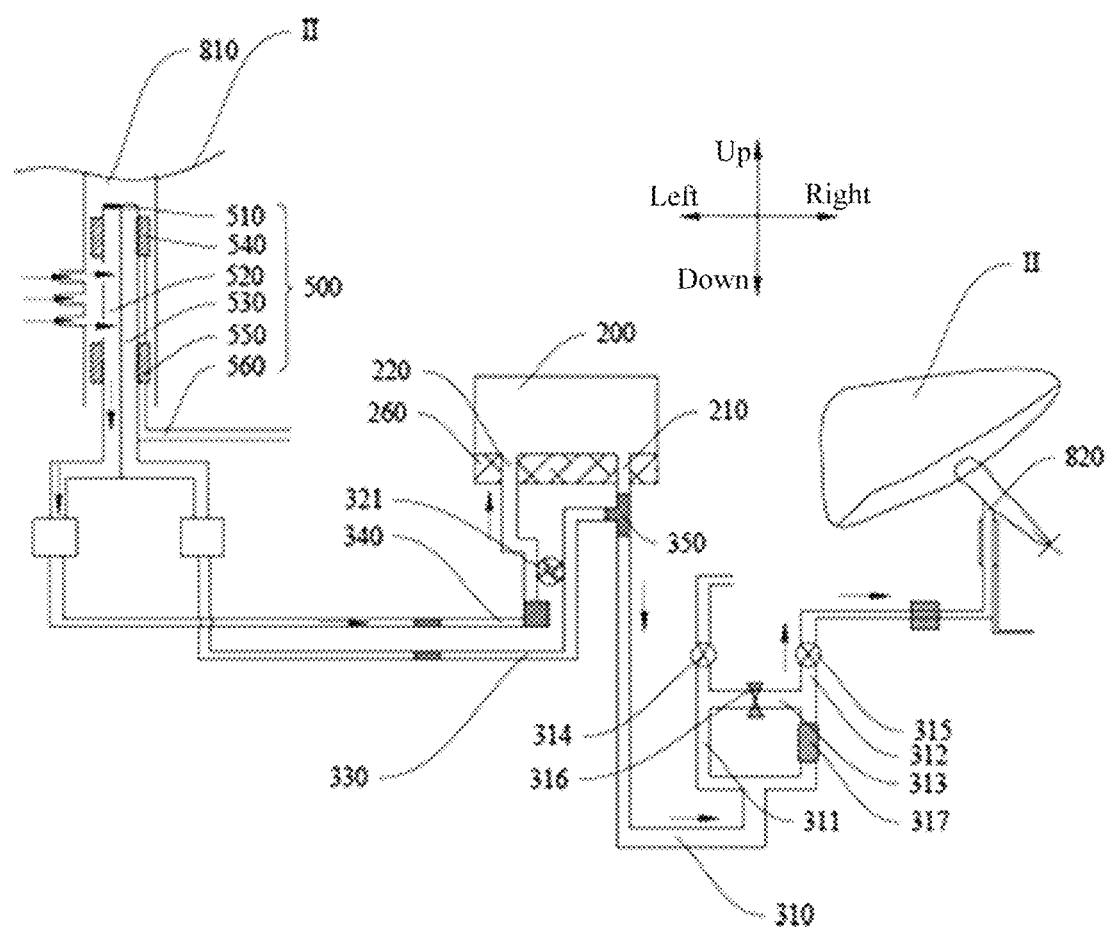
FIG. 3 is a schematic structural diagram that the ischaemia-free organ perfusion device establishes a circulation with the inferior vena cava of the donor and a splenic/gastroduodenal artery according to an embodiment of the present invention.
Figure 5:
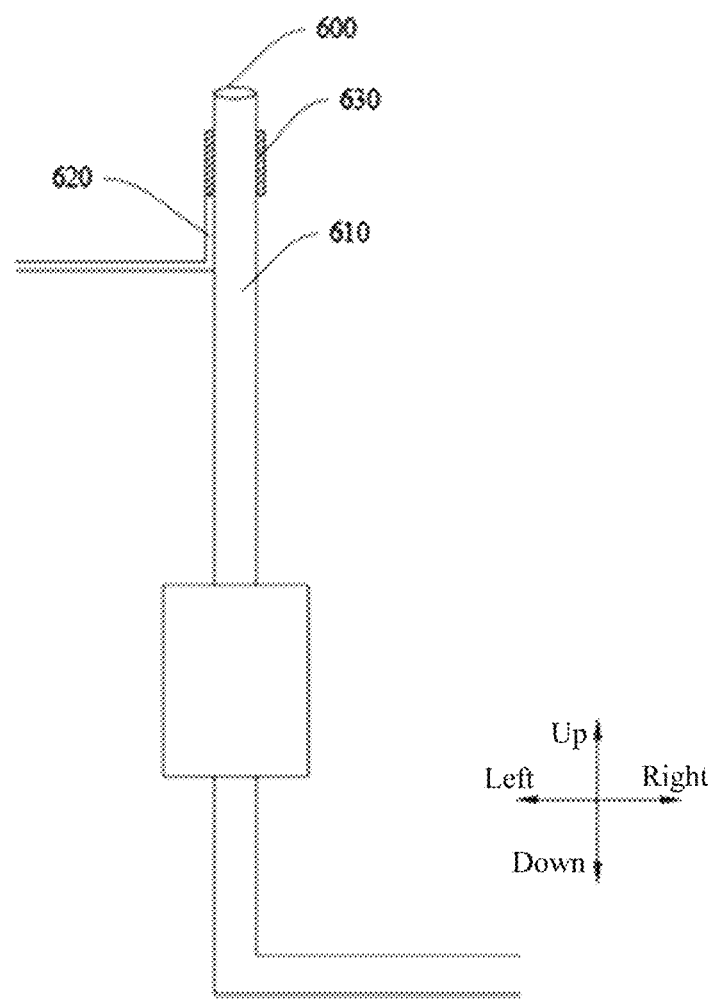
FIG. 5 is a schematic structural diagram of a first puncture catheter (a second puncture catheter) in an embodiment of the present invention.
Figure 6:
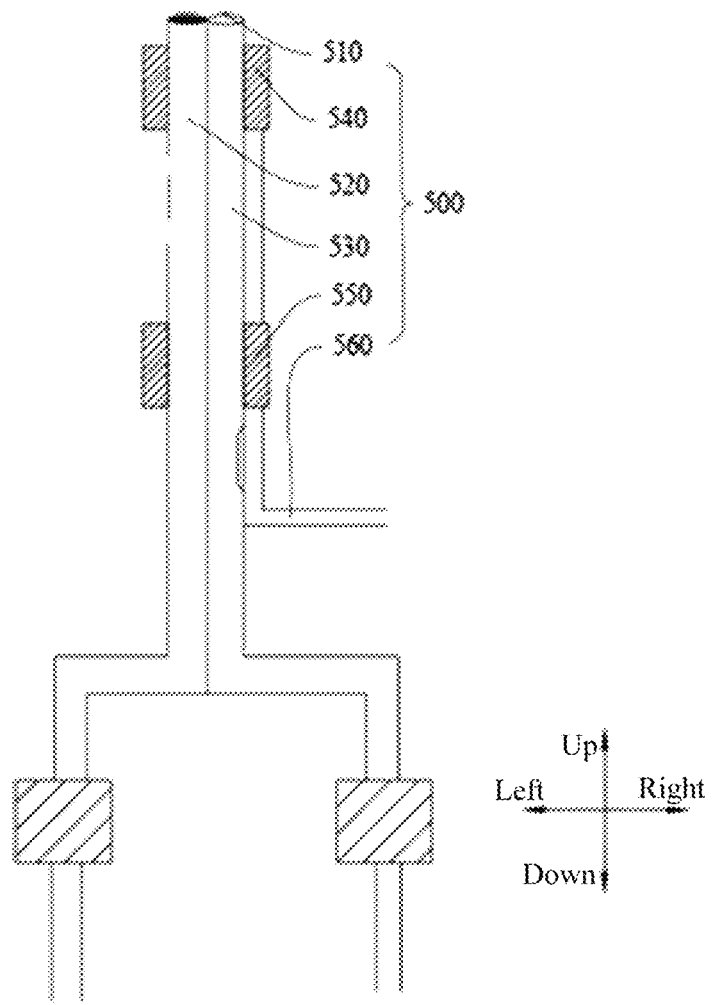
FIG. 6 is a schematic structural diagram of an inferior vena cava puncture catheter in an embodiment of the present invention.

Then, the liver and surrounding tissues of the liver are dissociated, one end (namely an upper end in FIG. 5) of a first puncture catheter (the structure of the first puncture catheter is shown in FIG. 5) is inserted into a splenic/gastroduodenal artery (in the present application, the splenic/gastroduodenal artery refers to a splenic artery or a gastroduodenal artery, and the splenic artery and the gastroduodenal artery are both communicated with a liver artery). The other end of the first puncture catheter (namely a right end in FIG. 5) is inserted into the second perfusion port 120 of the first container 100 (as shown in FIG. 3, it should be explained that the organs in donor acquisition stage II as shown in two places in FIG. 3 refer to one same organ, which means that the liver is still on the donor at the moment, and is not isolated from the donor). At the moment, the blood of the donor is slowly recovered with a low flow by the drive of the third pump 321, and the perfusate in the second container 200 enters the splenic/gastroduodenal artery 820 by the action of the second pump 315 for pulsatile perfusion (which means that the perfusate enters the liver through the second flow path 320).

Figure 4:
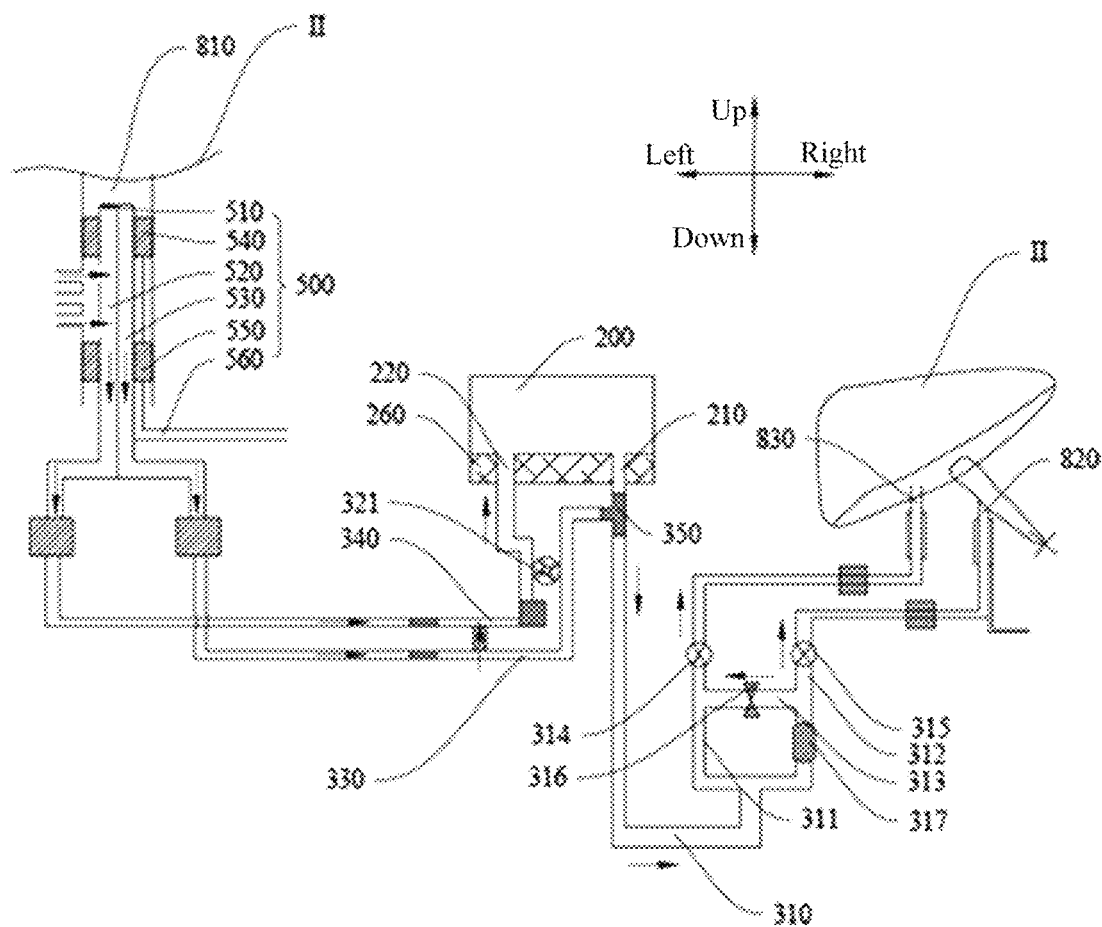
FIG. 4 is a schematic structural diagram that the ischaemia-free organ perfusion device establishes a circulation with the inferior vena cava of the donor, the splenic/gastroduodenal artery and a portal vein according to an embodiment of the present invention.

A four-way valve 360 is arranged at an intersection of the second flow path 320 and the third flow path 330, and the second flow path 320 is intersected with the fourth flow path 340. A three-way valve 350 is arranged at an intersection of the third flow path 330 and the first flow path 310. In the state shown in FIG. 3, upper and lower ends of the four-way valve 360 are not communicated, and a left end of the three-way valve 350 is communicated. The blood of the donor flows into the venous catheter lumen 520 and flows back into the second container 200 through the fourth flow path 340 (the third pump 321 is the peristaltic pump) to provide power for the blood to flow back. The second pump 315 drives the perfusate in the second container 200 to enter the splenic/gastroduodenal artery 820 through the second branch 312 of the first flow path 310. Then, one end of a second puncture catheter (the structure of the second puncture catheter is the same as that of the first puncture catheter) is inserted into a portal vein 830, and the other end of the second puncture catheter is inserted into the first perfusion port 110 of the first container 100 (as shown in FIG. 4, it should be explained that the organs in donor acquisition stage II as shown in two places in FIG. 4 refer to one same organ, which means that the liver is still on the donor at the moment, and is not isolated from the donor). At the moment, the upper and lower ends of the four-way valve 360 are communicated (left and right ends are not communicated), and upper and lower ends of the three-way valve 350 are communicated (the left end is not communicated). The blood of the donor flows out through the venous catheter lumen 520 and the auxiliary catheter lumen 530, the blood in the venous catheter lumen 520 flows into the second container 200 through the fourth flow path 340, and the blood in the auxiliary catheter lumen 530 flows into the fourth flow path 340 through the upper and lower ends of the four-way valve 360 and then flows into the second container 200. The perfusate in the second container 200 is perfused to the portal vein 830 and the splenic/gastroduodenal artery 820 by the action of the first pump 314 and the second pump 315. After the connection above being established, a connected part between the liver and the donor may be fully dissociated, the liver is quickly transferred into the first container 100, the venipuncture catheter 500 is cut off (a part of the venipuncture catheter 500 remains in the inferior vena cava 810), the first plug-in port 331 of the perfusion device is closed, and the venipuncture catheter 500 (the venipuncture catheter 500 connected with the inferior vena cava 810) is inserted into the third perfusion port 130 of the first container 100, thus the first circulation is established among the liver in the first container 100, the first branch 311, the second branch 312, the second container 200 and the second flow path 320 (as shown in FIG. 1, at the moment, the upper and lower ends of the four-way valve 360 are communicated, and the upper and lower ends of the three-way valve 350 are communicated). The perfusate in the second container 200 is perfused to the portal vein 830 through the first branch 311 by the action of the first pump 314, the perfusate in the second container 200 is perfused to the splenic/gastroduodenal artery 820 through the second branch 312 by the action of the second pump 315, and the perfusate in the isolated liver returns to the second container 200 through the second flow path 320 by the action of the third pump 321 (namely the peristaltic pump). The first pump 314 and the second pump 315 may be centrifugal pumps or other types of pumps. During transplantation of the isolated organ to the recipient, a hepatic artery, a portal vein, a hepatic superior vena cava and a hepatic inferior vena cava of the organ of the donor are connected with corresponding parts of the recipient one by one, and arteries and veins of the organ are gradually disconnected from the perfusion device. The perfusion device is capable of maintaining the perfusion for the organ during the process, a pressure detection assembly and a control system maintain a stable blood flow during implantation, and various control and monitoring procedures monitor a functional condition of the organ during organ implantation to the recipient in real time until the organ is completely transplanted to the recipient.

The second flow path 320 and the fourth flow path 340 have a first shared tube, and the first shared tube is provided with a leukocyte filter 342 for removing leukocytes in a circulating liquid circulating into the second container 200 through the second flow path 320 and the fourth flow path 340. In addition, the first flow path 310 is provided with a thrombus filter 319 for removing thrombus in the perfusate entering the organ.

The perfusion device in the present invention is useful to recover the blood of the donor, utilize the blood effectively, perfuse the organ uninterruptedly from the stage of acquiring the organ from the donor, and effectively prevent the organ from being in an ischemia condition in the stage of acquiring the organ from the donor, so that blood supply for the organ would not be interrupted in a whole process from acquiring the organ from the donor, storing the isolated organ to implanting the isolated organ to the recipient, thus effectively maintaining vitality of the organ. A connection mode between the arteries and veins of the liver and the perfusion device and a circulation establishment mode are described by taking the liver as an example in a embodiment of the present invention, and the perfusion device of the present invention may also be applied to other organs (such as kidney). For other types of organs, the perfusion device of the present invention may be used according to circulating characteristics of the organs, which will not be described in detail herein.

In some specific embodiments of the present invention, the ischaemia-free organ perfusion device further includes an oxygenator 317 and a unidirectional flow regulating valve 316. The first flow path 310 further includes a third branch 313, the oxygenator 317 is arranged in the second branch 312, and the third branch 313 communicates the first branch 311 with the second branch 312. The third branch 313 is provided with the unidirectional flow regulating valve 316, and the unidirectional flow regulating valve 316 is configured for making the perfusate flowing through the oxygenator 317 flow unidirectionally into the first branch 311 through the third branch 313.

Specifically, as shown in FIG. 1, the oxygenator 317 is arranged in the second branch 312, and the oxygen saturation of the perfusate flowing through the oxygenator 317 can be improved by the action of the oxygenator 317. After fully oxygenation of the perfusate flowing through the oxygenator 317 in the second branch 312, the oxygen saturation of the perfusate is 95% to 100%. Most of oxygenated perfusate is perfused to the splenic/gastroduodenal artery 820 of the liver through the second branch 312, and a small part of oxygenated perfusate enters the first branch 311 through the third branch 313. The perfusate in the first branch 311 is mixed with the perfusate in the third branch 313 with high oxygen saturation, so that the oxygen saturation of the perfusate is maintained at about 85%, and the perfusate with about 85% oxygen saturation is perfused to the portal vein 830 of the liver through the first branch 311. The third branch 313 is arranged at downstream of the oxygenator 317, and the unidirectional flow regulating valve 316 in the third branch 313 makes the perfusate flow only into the first branch 311 from the second branch 312. An opening degree of the unidirectional flow regulating valve 316 may be regulated according to the oxygen saturation of the perfusate in the first branch 311. When the oxygen saturation of the perfusate in the first branch 311 is low, the unidirectional flow regulating valve may be opened wide to make much perfusate with oxygen saturation of 95% to 100% flow into the first branch 311. When the oxygen saturation of the perfusate in the first branch 311 is high, little perfusate with oxygen saturation of 95% to 100% flows into the first branch 311 or the unidirectional flow regulating valve 316 is directly closed. By the above arrangement mode, various requirements of different flow paths for the oxygen saturation of the perfusate can be met by using one oxygenator 317, which can reduce use of the oxygenators and then reduce a cost of the device.

In some embodiments of the present invention, the ischaemia-free organ perfusion device further includes an organ evaluation system, wherein the organ evaluation system includes an organ evaluation computer system 440, a blood gas detection system 430 and an imager 410. The blood gas detection system 430 is configured for detecting blood gas of the perfusate in the first flow path 310 and the second flow path 320. The imager 410 is configured for capturing an image of the organ (namely the isolated organ I) in the first container 100. The organ evaluation computer system 440 is configured for receiving signals from the blood gas detection system 430 and the imager 410, and evaluating the condition of the isolated organ I.

Specifically, the blood gas detection system 430 may be CDI500 Blood Parameter Monitoring System, and the blood gas detection system 430 is capable of detecting blood gas in the first branch 311, the second branch 312 and the second flow path 320. The CDI500 Blood Parameter Monitoring System is capable of monitoring lactate values of the perfusate in the first branch 311, the second branch 312 and the second flow path 320 in different time periods, and sending the monitored lactate values to the organ evaluation computer system 440, and the organ evaluation computer system 440 may analyze changes of lactate at different time points to reflect a metabolic condition of the isolated liver. If an overall level of the lactate in the perfusate is low, it is indicated that the liver is good in metabolism. If the overall level of the lactate in the perfusate is high or on the rise, it is indicated that the isolated liver perfused is poor in functional condition, or a function of the isolated liver is gradually deteriorating.

The imager 410 may be a thermal imager. The imager 410 is arranged above the first container 100, and is configured for capturing the condition of the organ in the first container 100. Since the isolated liver is a living organ with an ability of metabolic heat production, when microcirculation of each part of the isolated liver is unobstructed, an image captured by the thermal imager is an image with uniform temperature, and temperature displayed is maintained at 34° C. under a normal condition. When a certain segment of the liver suffers from microcirculation vascular thrombosis, foreign body embolism, or microcirculation vasospasm, etc., the segment of the liver may have insufficient perfusate, weakened metabolism, and imaging worse than that of surrounding segments in thermal imaging.

The imager 410 may also be a fluorescence imager. Indocyanine green (ICG) is a common diagnostic drug in clinic, and is mainly used for examining a function and an effective blood flow of the liver. After being injected, the perfusate is immediately combined with plasma proteins, rapidly distributed in blood vessels of the liver with circulation, efficiently and selectively absorbed by liver cells, and then excreted into bile in free form from the liver cells. The imager 410 captures the image of the organ absorbed with ICG, and the image shows green fluorescence. If the image captured by the imager 410 is an image with uniform green fluorescence, it is indicated that the perfusion is well if the cell functions of the segments of the liver are not much different. If the image captured by the imager 410 is an image with nonuniform green fluorescence, it is indicated that a certain segment of the liver is hypoperfused, or the function of liver cells in the segment are failed.

The imager 410 may have a fluorescence imaging function and a thermal imaging function at the same time. In order to visualize the condition of the organ, a displayer 420 is usually provided, and the displayer 420 can display the image captured by the imager. An operator can visually observe the image displayed by the displayer 420, and take a measure for processing according to the corresponding image.

In some embodiments of the present invention, the ischaemia-free organ perfusion device further includes a control system 450. The control system 450 regulates the unidirectional flow regulating valve 316 according to oxygen saturation of the perfusate in the first branch 311 detected by the blood gas detection system 430.

Specifically, during perfusion of the liver, oxygen saturation of the perfusate entering the portal vein 830 should be maintained at about 85%, and oxygen saturation of the perfusate entering the splenic/gastroduodenal artery 820 (namely the hepatic artery) is above 95%. The CDI500 Blood Parameter Monitoring System detects blood gas of the perfusate in the first branch 311 and the second branch 312, and sends corresponding blood gas parameters to the control system 450. If the oxygen saturation of the perfusate in the first branch 311 (namely the perfusate entering the portal vein 830) is lower than 85%, the control system 450 sends a relevant instruction to the unidirectional flow regulating valve 316 to increase the flow of the perfusate flowing into the first branch 311 through the third branch 313, thus increasing the oxygen saturation of the perfusate entering the portal vein 830. If the oxygen saturation of the perfusate in the first branch 311 (namely the perfusate entering the portal vein 830) is higher than 85%, the control system 450 sends a relevant instruction to the unidirectional flow regulating valve 316 to reduce the flow of the perfusate flowing into the first branch 311 through the third branch 313, thus decreasing the oxygen saturation of the perfusate entering the portal vein 830. In order to further make the oxygen saturation of the perfusate in the second branch 312 meet the perfusion requirements, the second container 200 is provided with a gas inlet 240 and a gas outlet 250. When the oxygen saturation of the perfusate in the second branch 312 (namely the perfusate entering the hepatic artery) is lower than 95%, the control system 450 sends a relevant instruction to the oxygenator 317 to increase a concentration of oxygen in a mixed gas entering the oxygenator 317, and the control system 450 sends relevant instruction information to the gas inlet 240 and the gas outlet 250 to open both the gas inlet and the gas outlet at the same time. Oxygen enters a cabin and carbon dioxide is discharged from the cabin, which increases an oxygen partial pressure in the second container 200, and then increases a concentration of oxygen physically dissolved in the circulating liquid, so that the oxygen saturation of the perfusate in the second branch 312 (namely the perfusate entering the hepatic artery) is maintained at 95% to 100%.

In some embodiments of the present invention, the ischaemia-free organ perfusion device further includes a secretion collector 160 and a fifth flow path 370. The first container 100 is further provided with a secretion outlet 140, and the secretion outlet 140 is communicated with the secretion collector 160 through the fifth flow path 370. The organ evaluation computer system 440 is capable of analyzing a secretion in the secretion collector 160 to evaluate the condition of the isolated organ I.

Specifically, the first container 100 is further provided with the secretion outlet 140, and the secretion collector 160 is arranged outside the first container 100. The secretion collector 160 is connected with a hepatic duct of the isolated liver through the fifth flow path 370 and the secretion outlet 140 for collecting bile. Under a normal condition, the liver cells may continuously secrete the bile, and the organ evaluation computer system 440 evaluates secretion and excretion functions of the isolated liver according to bile production per unit time. In addition, the organ evaluation computer system 440 acquires changes of concentrations of ICG in the perfusate in the first channel 310 and the second channel 320 (which are namely changes of ICG concentrations in the perfusate entering and leaving the liver), and the organ evaluation computer system 440 indirectly reflects absorption and metabolism of ICG by the isolated liver according to a difference value between the changes and a change trend with time for evaluating the metabolic function of the liver.

In some embodiments of the present invention, the ischaemia-free organ perfusion device further includes a pressure detection assembly and a control system 450. The first branch 311 and the second branch 312 are respectively provided with the pressure detection assembly. The control system 450 regulates a flow rate of the first pump 314 according to a perfusion pressure of the first branch 311, and regulates a flow rate of the second pump 315 according to a perfusion pressure of the second branch 312.

Figure 7:
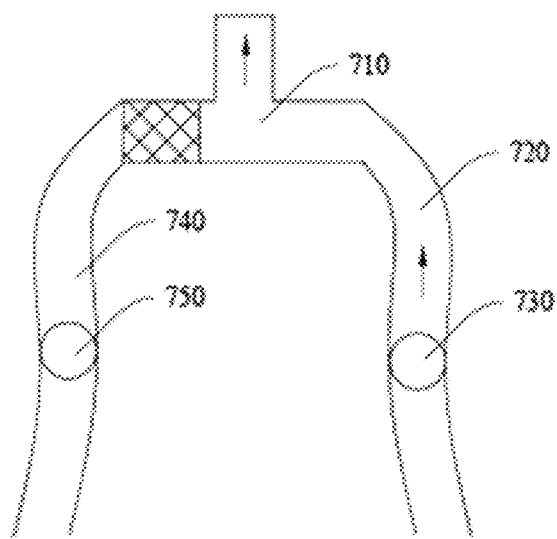
FIG. 7 is a schematic structural diagram of a pressure detection assembly in an embodiment of the present invention.
Figure 7:
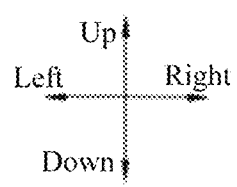

Specifically, when the liver is perfused, if the perfusion pressure is too low, the isolated organ may be hypoperfused, and the organ may be ischemic, followed by an ischemia-reperfusion injury. If the perfusion pressure is too high, the large flow rate may cause a damage to endothelial cells of the hepatic vascular. In addition, the perfusion pressure is also one of indexes reflecting the condition of the isolated liver. The pressure detection assembly (a schematic structural diagram of the pressure detection assembly is shown in FIG. 7) is arranged to measure the perfusion pressure, so that the condition of the liver can be effectively monitored. The first branch 311 and the second branch 312 are both provided with the pressure detection assembly, and the pressure detection assemblies in the first branch 311 and the second branch 312 may have a same structure. The pressure detection assembly is configured for detecting the perfusion pressure or the flow rate in the perfusion flow path.

When the liver starts to be perfused, the perfusion is performed at the pressure suitable for the liver (the perfusion pressure has a set range). The pressure detection assemblies monitor the perfusion pressures or the flow rates of the first branch 311 and the second branch 312 in real time, and send the corresponding data to the control system 450. If the pressures or the flow rates detected by the pressure detection assemblies exceed 10% of the set range, the control system sends an instruction to regulate a rotation speed of the corresponding first pump 314 or second pump 315, so as to regulate the perfusion pressures of the first branch 311 and the second branch 312, thus making the perfusion pressures of the first branch 311 and the second branch 312 approach the set range. If the pressures or the flow rates detected by the pressure detection assemblies exceed the set range by 15%, the control system may give an alarm to remind the operator to perform a manual control procedure. After receiving the alarm, the operator analyzes reasons for the pressure or the flow rate exceeding a standard, and takes corresponding measures to correct the blood pressure or the flow rate within the set range.

In some embodiments of the present invention, the pressure detection assembly includes a three-way plug valve 710, a first detection tube 720, a second detection tube 740, a first pressure sensor 730 and a second pressure sensor 750. As shown in FIG. 7, one end of the three-way plug valve 710 is communicated with the corresponding branch of the first flow path 310, and the other two ends of the three-way plug valve 710 are respectively connected with the first detection tube 720 and the second detection tube 740. The first pressure sensor 730 is configured for detecting a pressure of the first detection tube 720, and the second pressure sensor 750 is configured for detecting a pressure of the second detection tube 740. A height difference between the first pressure sensor 730 and the corresponding perfusion port is the same as that between the second pressure sensor 750 and the corresponding perfusion port. The three-way plug valve is capable of being switched to a detection state that the first detection tube is communicated with the corresponding branch and the second detection tube is disconnected from the corresponding branch.

Specifically, at present, the perfusion pressure collected by the pressure sensor is usually a total pressure value of a detection point, including a static pressure caused by a height difference between positions of the detection point and the sensor and a dynamic pressure caused by resistance of blood circulating through the organ. During perfusion of the organ, only the dynamic pressure is medically meaningful. Therefore, only the dynamic pressure at an inlet of the blood is expected to be detected. If a position of an inlet of the organ is changed, the detected total pressure may deviate from a true value and fluctuate even if the dynamic pressure is not changed. In order to overcome this defect, the pressure detection assemblies are arranged to detect pressures of the portal vein and the artery of the liver respectively.

An arrangement mode of the pressure detection assembly in the first branch 311 is described by taking the pressure detection assembly arranged in the first branch 311 as an example. The pressure detection assembly includes the three-way plug valve 710, the first detection tube 720, the second detection tube 740, the first pressure sensor 730 and the second pressure sensor 750. As shown in FIG. 7, an upper end of the three-way plug valve 710 is connected with the first perfusion port 110, and the other two ends of the three-way plug valve 710 are respectively connected with the first detection tube 720 and the second detection tube 740, wherein the first detection tube 720 is a pipeline of the first branch 311. During perfusion, the three-way plug valve 710 is rotated until the first perfusion port 110 is communicated with the first detection tube 720, and the first perfusion port 110 and the second detection tube 740 are not communicated with each other. The first detection tube 720 is provided with the first pressure sensor 730, and the second detection tube 740 is provided with the second pressure sensor 750. The first pressure sensor 730 and the second pressure sensor 750 are located below the first perfusion port 110, and a height difference between the first pressure sensor 730 and the first perfusion port 110 is the same as that between the second pressure sensor 750 and the first perfusion port 110. The pressure values detected by the first pressure sensor 730 include the static pressure caused by the height difference between the positions of the detection point and the sensor and the dynamic pressure caused by the perfusate flowing through the portal vein 830. The pressure value detected by the second pressure sensor 750 is the static pressure caused by the height difference between the positions of the detection point and the sensor. By calculating a difference between the pressure values detected by the first pressure sensor 730 and the pressure value detected by the second pressure sensor 750, the dynamic pressure at the inlet of the perfusate during perfusion is obtained. An arrangement mode of the pressure sensor assembly in the second branch 312 is the same as that of the pressure sensor assembly in the first branch 311, which is not described in detail herein.

By means of the above arrangement mode, the perfusion pressure can be measured more accurately, and the corresponding regulation can be performed more accurately. In addition, during an operation of organ acquisition or transplantation, the organ needs to be transferred to the perfusion device from the donor or transferred to the recipient from the perfusion device, and there may be a large height difference between the donor and the perfusion device or between the recipient patient and the perfusion device. By arrangement of the pressure detection assemblies above, pressure distortion caused by the height differences can be effectively avoided, so that the organ is kept in a good condition, the blood supply is ensured to be suitable for the transplanted organ, and excessive or insufficient blood supply for the organ is avoided.

In some specific embodiments of the present invention, the ischaemia-free organ perfusion device further includes a doser 318 and a control system 450. The doser 318 is configured for injecting a medicament into the first flow path 310, and the control system 450 controls the doser 318 according to pH value or HCO3− value of the perfusate in the first flow path 310 detected by the blood gas detection system 430.

Specifically, the doser 318 is filled with a sodium bicarbonate medicament, and the pH value of the perfusate is regulated by releasing the sodium bicarbonate medicament in the doser 318 into the perfusate in the first flow path 310. The doser 318 is determined whether to add the sodium bicarbonate medicament into the first flow path 310 according to instruction from the control system 450. Specifically, if the pH value <7.1 or the HCO3− value <5 mmol of the perfusate in the first flow path is detected by the CDI500 Blood Parameter Monitoring System, the control system sends a relevant instruction to the doser 318, and the sodium bicarbonate medicament is released from the doser 318 into the first flow path 310, so that the pH value of the perfusate in the first flow path 310 is regulated (which means that the pH value of the perfusate entering the organ is regulated).

In some specific embodiments of the present invention, the ischaemia-free organ perfusion device further includes a control system 450. A temperature sensor (not shown) and a heat preservation system 260 are arranged in the second container 200, and the control system 450 is configured for regulating operation of the heat preservation system 260 according to a detected value by the temperature sensor, so that a temperature of the perfusate in circulating path is maintained within a set range.

Specifically, the temperature sensor is arranged in the second container 200, and the temperature sensor is configured for detecting the temperature of the perfusate in the second container 200. The heat preservation system 260 is arranged in the second container 200, and the heat preservation system 260 may be a water bath system or other types of systems that are convenient to maintain a constant temperature of the perfusate. The heat preservation system 260 is configured for preserving heat of the perfusate, and maintaining the temperature of the perfusate at 34° C. to 36° C. to simulate a normal temperature of a human body. The control system 450 regulates the operation of the heat preservation system 260 according to the detected value by the temperature sensor, so that the temperature of the perfusate in a circulating pipeline is maintained at 34° C. to 36° C.

In some specific embodiments of the present invention, the ischaemia-free organ perfusion device further includes a control system 450, a liquid supplementing device (not shown), a liquid level sensor (not shown) and an osmotic pressure sensor (not shown). The second container 200 is provided with a liquid injection port 230, the liquid level sensor is configured for detecting a liquid level height of the second container 200, the osmotic pressure sensor is arranged at a bottom portion of the second container 200, and the control system 450 is configured for controlling the liquid supplementing device according to data from the liquid level sensor and the osmotic pressure sensor, so that a solution in the liquid supplementing device is injected into the second container 200 through the liquid injection port 230.

Specifically, during circulating perfusion, the perfusate may be continuously reduced. In order to maintain a reliable operation of the perfusion device, the liquid level sensor and the osmotic pressure sensor are provided, the liquid level height of the second container 200 is detected by the liquid level sensor, and the second container 200 is provided with the osmotic pressure sensor at a bottom portion. The control system 450 analyzes capacity and osmotic pressure information of the second container 200 according to the data detected by the liquid level sensor and the osmotic pressure sensor, calculates a total volume and a concentration of a liquid to be supplemented, and feeds the calculated values back to the liquid supplementing device (not shown). The liquid supplementing device injects different volumes of 0.9% sodium chloride and concentrated 10% sodium chloride into the second container 200 according to the calculated values from the control system 450, thus completing regulation to a capacity of the second container 200.

In some specific embodiments of the present invention, a plurality of lifting columns 150 is arranged at a bottom portion of the first container 100, and the plurality of lifting columns 150 are capable of being lifted in a cross manner.

Specifically, the first container 100 is provided with the plurality of lifting columns 150 at the bottom portion. When the isolated organ I is placed in the first container 100, the plurality of lifting columns 150 play a role of supporting the isolated organ I, and the lifting columns 150 are alternately lifted at certain time intervals. On one hand, the lifting columns may massage the liver, and on the other hand, the lifting columns may prevent ischemia and necrosis caused by long-term stress on a contact surface at a bottom portion of the liver. The lifting column 150 is provided with a cushion at a top end, and the cushion is provided with a layer of film that does not absorb the liquid, so that the lifting column 150 can gently act on the isolated organ, thus preventing the isolated organ from being damaged.

In addition, in order to make an environment in the first container 100 more similar to that in an abdominal cavity, a spray jet 170 is arranged in the first container 100, and water mist is sprayed into the first container 100 through the spray jet 170, so as to maintain a humidified environment in the first container 100, and prevent liquid of the organ from being evaporated and lost. The perfusion port and the secretion outlet 140 in the first container 100 are both quick ports, which can complete establishment of the circulating pipeline quickly and simply during the process from organ acquisition from the donor to organ transfer to the first container 100, so as to reduce an influence on the blood supply for the isolated organ. A top portion of the first container 100 is configured as an automatic double cabin cover, and the interior of the cabin cover is coated with a dark biological material (such as black), so as to make the first container 100 form a closed space, and play a role of preserving heat and moisture and establishing a closed sterile area, thus constructing a simulated environment of the abdominal cavity. In addition, the dark biological material may be useful in constructing a dark closed environment of the abdominal cavity, which is beneficial for thermal imaging and fluorescence imaging systems to come into play.

An ischaemia-free organ perfusion method is disclosed in an embodiment of a second aspect of the present invention, which uses the ischaemia-free organ perfusion device of the first aspect above.

The ischaemia-free organ perfusion method is specifically described by taking a liver as an example. The puncture catheter head 510 of the venipuncture catheter 500 is inserted into the first vein (namely the inferior vena cava 810) of the donor, the auxiliary catheter lumen 530 of the venipuncture catheter 500 is communicated with the third flow path 330 (which means that the auxiliary catheter lumen 530 of the venipuncture catheter 500 is connected with an end of the third flow path 330 of the perfusion device, that is, a distal end of the auxiliary catheter lumen 530 is connected with the first plug-in port 331 of the third flow path 330), the venous catheter lumen 520 of the venipuncture catheter 500 is communicated with the fourth flow path 340 (which means that the venous catheter lumen 520 of the venipuncture catheter 500 is connected with the second plug-in port 341 of the fourth flow path 340 of the perfusion device), and the second circulation is established (which means that the circulation between the second container 200 of the perfusion device and the liver of the donor is established). The perfusate in the second container 200 enters the inferior vena cava 810 of the donor through the third flow path 330 and the auxiliary catheter lumen 530, and meanwhile, blood in the liver in donor acquisition stage enters the second container 200 through the venous catheter lumen 520 and the fourth flow path 340.

As shown in FIG. 2, the venipuncture catheter 500 is provided with the puncture catheter head 510, an upper balloon 540, a lower balloon 550, the auxiliary catheter lumen 530 and the venous catheter lumen 520. Before acquiring the liver, under guidance of ultrasonic intervention, the puncture catheter head 510 of the venipuncture catheter 500 is placed in the inferior vena cava 810 of the donor, an ultrasonic probe judges a position of the puncture catheter head 510 by contrast agent ingredient in the upper and lower balloons (540, 550), so as to position the upper balloon 540 3 cm above an inflow port of the inferior vena cava 810 of the liver and the lower balloon 550 3 cm below the inflow port of the inferior vena cava 810. A distal end of the auxiliary catheter lumen 530 of the puncture catheter head 510 is connected with the first plug-in port 331 of the third flow path 330 of the perfusion device through an anti-twisting structure, and a distal end of the venous catheter lumen 520 of the puncture catheter head 510 is connected with the second plug-in port 341 of the fourth flow path 340 of the perfusion device. In this stage, the upper and lower balloons (540, 550) both do not fetch water. As shown in FIG. 2, at the moment, left and right ends of the four-way valve 360 are communicated, and upper and lower ends of the four-way valve are not communicated. Upper and left ends of the three-way valve 350 are communicated. After the circulation above is established, the perfusate in the second container 200 flows out through the first port 210, and enters the inferior vena cava 810 of the donor through the third flow path 330 and the auxiliary catheter lumen 530. Meanwhile, the blood in the liver in donor acquisition stage flows back into the second container 200 through the venous catheter lumen 520, the fourth flow path 340 and the second port 220, so that the perfusate in the second container 200 has red blood cell ingredient carrying oxygen.

One end of a first puncture catheter 600 is inserted into an artery (namely the splenic/gastroduodenal artery 820) in the liver of the donor, and the other end of the first puncture catheter 600 is connected with the second perfusion port 120 of the first container 100. At the moment, a third circulation is established among the first container 100, the fourth flow path 340, the third pump 321, the second branch 312 and the liver of the donor, so that the blood in the liver enters the second container 200 through the fourth flow path 340, and the perfusate in the second container 200 is perfused into the splenic/gastroduodenal artery 820.

The structure of the first puncture catheter 600 is shown in FIG. 5, and an upper end of the first puncture catheter 600 is placed in the splenic/gastroduodenal artery 820 of the liver. As shown in FIG. 3, the three-way valve 350 is regulated to communicate the upper and lower ends of the three-way valve 350, so that the perfusate is introduced into the first flow path 310 and the second branch 312 for exhaust. After exhaust, the distal end of the first puncture catheter 600 (the lower end shown in FIG. 5) is connected with the second perfusion port 120 of the first container 100 through an anti-twisting mechanism. A balloon 630 is inflated through a first balloon tubule 620, and the puncture catheter head in the splenic/gastroduodenal artery is fixed by ligaturing with a suture. The four-way valve 360 is regulated that the upper and left ends of the four-way valve 360 are communicated. The blood of the donor is slowly recovered with a low flow by the drive of the third pump 321, entering the fourth flow path 340 through the second plug-in port 341 of the fourth flow path 340 of the perfusion device, and then the second container 200 through the second port 220. The perfusate in the second container 200 flows out through the first port 210, and enters the first flow path 310 and the second branch 340. At the moment, the unidirectional flow regulating valve 316 is closed, and the perfusate flows into the second branch 312 of the first flow path 310, enters the oxygenator 317 to be oxygenated, and enters the splenic/gastroduodenal artery 820 of the liver driven by the second pump 315 for pulsatile perfusion (arrows in FIG. 3 indicate the circulating paths of the perfusate).

One end of a second puncture catheter is inserted into a second vein (the portal vein 830) of the liver in donor acquisition stage, and the other end of the second puncture catheter is connected with the first perfusion port 110 of the first container 100, so that the perfusate in the second container 200 is perfused into the portal vein 830 of the liver. After the blood of the liver in donor acquisition stage is recovered, the fourth flow path is closed.

The structure of the second puncture catheter is the same as that of the first puncture catheter 600. An upper end of the second puncture catheter punctures the portal vein 830 of the liver of the donor, and the unidirectional flow regulating valve 316 is opened and the first pump 314 is switched on to exhaust in the first branch 311. After exhaust, a lower end of the second puncture catheter is connected with the first perfusion port 110 of the first container 100 through an anti-twisting mechanism, the balloon is inflated through the balloon tubule, and the puncture catheter head in the hepatic artery is fixed by ligaturing with a suture. As shown in FIG. 4, a part of the perfusate in the second branch 312 fully oxygenated by the oxygenator 317 is shunted into the first branch 311, mixed with the perfusate in the first branch 311, and supplied to the portal vein 830 of the liver of the donor by the drive of the first pump 314. Meanwhile, the upper balloon 540 and the lower balloon 550 are fully filled with water through the second balloon tubule 560 of the inferior vena cava puncture catheter 500, and a hepatic superior vein, a hepatic median vein and a hepatic inferior vein are intersected in the inferior vena cava to form a closed cavity gap. The blood of the donor is recovered into the second container 200 through an opening of the auxiliary catheter cavity 530 by the action of the third pump 321. After the blood of the donor is fully recovered, a distal end of the auxiliary catheter cavity 530 is clipped to close the first plug-in port 331 of the third flow path 330 of the perfusion device.

A connected part between the organ and the donor is fully dissociated, the organ is placed in the first container 100, the venipuncture catheter 500 is cut off, and a free end (namely the free end of the puncture catheter head) of the part of the venipuncture catheter 500 communicated with the organ is inserted into the third perfusion port 130. At the point, the organ has been completely isolated from the donor, and is stored in the first container 100, and the first circulation is formed by the first container 100, the second container 200, the first flow path 310 and the second flow path 320. That is, the first pump 314 is configured for perfusing the perfusate in the second container 200 into the portal vein 830 of the liver through the first perfusion port 110. The second pump 315 is configured for perfusing the perfusate in the second container 200 into the splenic/gastroduodenal artery 820 of the liver through the second perfusion port 120. The third pump 321 is configured for making the perfusate in the isolated organ flow back into the second container 200 through the third perfusion port 130 and the second flow path 320. The perfusion device continuously perfuses the isolated organ by establishing the first circulation.

The connected part between the organ and the donor is fully dissociated, the organ is placed in the first container 100, the first plug-in port 331 of the perfusion device is closed, the venipuncture catheter 500 is cut off (the puncture catheter head 510 is still connected with the inferior vena cava 810 of the organ), and the puncture catheter head 510 connected with the inferior vena cava 810 is quickly inserted into the third perfusion port 130 of the first container 100. Left and right end ports of the four-way valve 360 are opened to complete gas discharge of the second flow path 320, and then upper and lower end ports of the four-way valve 360 are opened to establish the complete first circulation.

According to the ischaemia-free organ perfusion method of the present invention, the splenic/gastroduodenal artery and the portal vein are punctured in stages to ensure stable blood supply at different time points. The splenic/gastroduodenal artery is punctured with a puncture needle first, the puncture catheter head is guided to be inserted to the splenic/gastroduodenal artery, the balloon is inflated through the balloon tubule, and the puncture catheter head of the splenic/gastroduodenal artery is fixed by ligaturing with a suture. After blood flow in the hepatic artery being stable for several minutes, the portal vein is punctured with a puncture needle, the puncture catheter head is guided to be inserted to the portal vein, the balloon is inflated through the balloon tubule, and the puncture catheter head of the portal vein is fixed by ligaturing with a suture. A blood flow rate of the hepatic artery is smaller than that of the portal vein, and a diameter of the hepatic artery is small. After puncture and ligation, an influence on blood supply for the hepatic artery is greater than that of the portal vein. The splenic/gastroduodenal artery is punctured first, and at the moment, the portal vein is not interfered. The blood flow rate of the portal vein is large, which ensures basic blood supply for the liver, and is capable of preventing effectively the liver from being in an ischemia state. In addition, according to the method, the blood is further recovered, blood resources of the donor can be made full utilization. On a premise of following ethics and ensuring safety, the blood of the donor is used to maintain survival of the isolated organ freely, thus greatly solving a problem of shortage of blood resources.

In some specific embodiments of the present invention, a first sensor is arranged in the first puncture catheter 600, and a second sensor is arranged in the second puncture catheter. In the stage of acquiring the organ from the donor, hemodynamic parameters of the artery (the splenic/gastroduodenal artery 820) are collected by the first sensor, and hemodynamic parameters of the second vein (the portal vein 830) are collected by the second sensor. During the first circulation, the first pump 314 is operated based on the parameters collected by the second sensor, and the second pump 315 is operated based on the data collected by the first sensor.

Specifically, the first puncture catheter 600 and the second puncture catheter have a same structure, and the balloons 630 of the first puncture catheter and the second puncture catheter both contain a sensor chip (not shown). The first sensor in the first puncture catheter 600 is configured for collecting and recording hemodynamic information such as a pressure and a waveform of the pressure (a fluctuation range and a time changing trend), and a flow rate and a waveform of the flow rate (a fluctuation range and a time changing trend) of the splenic/gastroduodenal artery 820. The second sensor in the second puncture catheter is configured for collecting and recording hemodynamic information such as a pressure and a waveform of the pressure (a fluctuation range and a time changing trend), and a flow rate and a waveform of the flow rate (a fluctuation range and a time changing trend) of the portal vein 830. The first sensor and the second sensor transmit collected signals to the control system for analysis and processing. After establishing a complete closed circulating path in a simulated preservation stage of the isolated organ (that is, after establishing the first circulation), the control system 450 simulates the recorded hemodynamic parameters of the portal vein 830 and the splenic/gastroduodenal artery 820 of the liver of the donor, and sends instructions to the first pump 314 and the second pump 315, so that the first pump 314 perfuses the portal vein 830 of the isolated liver according to a perfusion mode of the in-situ portal vein 830 of the liver of the donor, and the second pump 315 perfuses the splenic/gastroduodenal artery 820 of the isolated liver according to a perfusion mode of the in-situ splenic/gastroduodenal artery 820 of the donor, thus maintaining perfusion pressure and flow rate of the portal vein and the hepatic artery within the recorded range. Through the above arrangement mode, the hemodynamic parameters of the hepatic artery and the portal vein can be copied in a "personalized" mode to ensure that the isolated liver is still in a specific perfusion state, which not only avoids an ischemia-reperfusion injury, but also prevents a hepatic vascular endothelial cell injury caused by excessively high perfusion pressure and flow rate.

In some specific embodiments of the present invention, a third sensor is arranged in the venipuncture catheter 500. In the stage of acquiring the organ from the donor, hemodynamic parameters of the first vein (the inferior vena cava 810) are detected by the third sensor, and during the first circulation, the third pump 321 is operated based on the parameters collected by the third sensor.

Specifically, the third sensor (not shown) is located on a lumen surface of a closed end of a venous catheter, and is configured for detecting hemodynamic information such as a pressure and a waveform of the pressure (a fluctuation range and a time changing trend), and a flow rate and a waveform of the flow rate (a fluctuation range and a time changing trend) of the first vein (namely the inferior vena cava 810), and transmitting the hemodynamic information to the control system 450 for analysis and processing. After establishing the complete closed circulating path in the simulated preservation stage of the isolated organ (that is, after establishing the first circulation), the control system 450 simulates the recorded hemodynamic parameters of the inferior vena cava 810, sends an instruction to the third pump 321, and controls a rotation speed of the third pump 321, so as to maintain a proper pressure of the inferior vena cava 810, ensure that the perfusate of the isolated liver can be fully recovered, and promote blood supply for the isolated liver.

A specific control process of the control system in the present invention is described hereinafter with reference to the embodiments. The control system is a computer inheritance processing system, which implements functions of automatic blood flow control, blood gas and blood oxygen control, capacity control, thermal imaging and fluorescence imaging control, and temperature control.

Automatic Blood Flow Control Procedure:

(1) Basic control procedure for perfusion pressure of splenic/gastroduodenal artery: after the puncture catheter head for the splenic/gastroduodenal artery is inserted into the splenic/gastroduodenal artery through puncture, a sensor chip contained in the balloon of the puncture catheter head collects and records hemodynamic information such as a pressure and a waveform of the pressure (a fluctuation range and a time changing trend), and a flow rate and a waveform of the flow rate (a fluctuation range and a time changing trend) of the splenic/gastroduodenal artery, and then transmits the hemodynamic information to the control system for analysis and processing. After establishing the complete closed circulating path in the simulated preservation stage of the isolated organ, the control system simulates the recorded hemodynamic parameters of the splenic/gastroduodenal artery of the liver of the donor, and sends an instruction to the second pump, so that the second pump performs pulse perfusion on the hepatic artery of the isolated liver according to the perfusion mode of the in-situ splenic/gastroduodenal artery of the liver of the donor, and the perfusion pressure and the flow rate of the splenic/gastroduodenal artery are maintained within the recorded range. Dynamic control procedure for perfusion pressure of splenic/gastroduodenal artery: if the pressure or the flow rate exceeds the recorded range by 10%, the control system 450 will be switched to the dynamic control procedure to control the pressure with the recorded flow rate as a target value. If a fluctuation range of the controlled blood pressure exceeds the recorded value by 15%, the perfusion device will send a reminder to remind an operator to perform manual control. After receiving the reminder, an implementation team will analyze reasons for the above situation and take corresponding measures to correct the blood pressure and the flow rate within the recorded range.

(2) Basic control procedure for perfusion pressure of portal vein: after the puncture catheter head for the portal vein is inserted into the portal vein through puncture, a sensor chip contained in the balloon of the puncture catheter head collects and records hemodynamic information such as a pressure and a waveform of the pressure (a fluctuation range and a time changing trend), and a flow rate and a waveform of the flow rate (a fluctuation range and a time changing trend) of the portal vein, and then transmits the hemodynamic information to the control system 450 for analysis and processing. After establishing the complete closed circulating path in the simulated preservation stage of the isolated organ, the control system simulates the recorded hemodynamic parameters of the portal vein of the liver of the donor, and sends an instruction to the first pump 314, so that the first pump 314 perfuses the portal vein of the isolated liver according to the perfusion mode of the in-situ portal vein of the liver of the donor, and the perfusion pressure and the flow rate of the portal vein are maintained within the recorded range. Dynamic control procedure for perfusion pressure of portal vein: if the pressure or the flow rate exceeds the recorded range by 10%, the control system 450 will be switched to the dynamic control procedure to control the pressure with the recorded flow rate as a target value. If a fluctuation range of the controlled blood pressure exceeds the recorded value by 15%, the perfusion device will send a reminder to remind an operator to perform manual control. After receiving the reminder, an implementation team will analyze reasons for the above situation and take corresponding measures to correct the blood pressure and the flow rate within the recorded range.

(3) Control procedure for pressure of inferior vena cava: in a mechanical maintenance stage of the isolated organ, the perfusate of the isolated liver enters the second flow path 320 through the circulating pipeline, flows into a shared tube of the second flow path 320 and the fourth flow path 340 through the four-way valve 360, and flows back through the second port 220 at the bottom portion of the second container 200 by the drive of the third pump 321, thus forming a closed loop of circulation. In this process, regulation for the rotation speed of the third pump 321 is restricted by the pressure of the inferior vena cava (the data collected by the third sensor), and the third sensor records an average pressure and feeds the average pressure back to the integrated control system. In the simulated preservation stage of the isolated organ, when a pressure value of the inferior vena cava sensed by the third sensor exceeds the recorded value, the control system will send an instruction to increase the rotation speed of the third pump 321. When the pressure value of the inferior vena cava sensed by the third sensor is lower than the recorded value, the control system 450 will send an instruction to decrease the rotation speed of the third pump 321.

Blood Gas and Blood Oxygen Control Procedure:

The blood gas control procedure has three main objectives. The first main objective is to maintain oxygen saturation of the perfusate supplied to the portal vein at about 85%, and maintain oxygen saturation of the perfusate supplied to the hepatic artery at over 95%. The second main objective is to simulate functions of lungs and kidneys to regulate blood gas. The CDI500 Blood Parameter Monitoring System monitors blood gas indexes such as oxygen saturation, pH, and HCO3− concentration of the perfusate in the second branch where entering the hepatic artery and the perfusate in the first branch 311 where entering the portal vein, and feeds the blood gas indexes back to control center. The control center sends relevant instruction information to the gas inlet 240 connected with the oxygen source and the gas outlet 250 of the second container, the unidirectional flow regulating valve 316, the doser 318, the oxygenator 317, etc. When it is monitored that the oxygen saturation of the perfusate in the second branch 312 where entering the hepatic artery 820 is lower than 95%, the control system 450 sends relevant instruction information to the oxygenator 317 to increase a concentration of oxygen in a mixed gas entering the oxygenator 317, and the control system sends relevant instruction information to the gas inlet 240 and the gas outlet 250 of the second container 200 to open the gas inlet 240 and the gas outlet 250 at the same time, so that oxygen enters the second container 200 and carbon dioxide is discharged from the second container 200, which increases an oxygen partial pressure in the second container 200, and then increases a concentration of oxygen physically dissolved in the perfusate. When it is monitored that the oxygen saturation of the perfusate in the first branch 311 where entering the portal vein is greater than 85%, the control system 450 sends relevant instruction information to the unidirectional flow regulating valve 316 to reduce a volume of the perfusate flowing into the first branch 311 from the second branch 312, thus reducing the oxygen saturation of the perfusate in the first branch 311 where entering the portal vein 830. When it is monitored that the oxygen saturation of the perfusate in the first branch 311 where entering the portal vein 830 is lower than 85%, the control system sends relevant instruction information to the unidirectional flow regulating valve 316 to increase the volume of the perfusate flowing into the first branch 311 from the second branch 312, thus increasing the oxygen saturation of the perfusate in the first branch 311 where entering the portal vein 830. When the pH<7.1 or the HCO3−<5 mmol of the perfusate in the first flow path is circularly monitored, the control system 450 sends relevant instruction information to the doser 318, and a sodium bicarbonate medicament cabin of the doser 318 releases a sodium bicarbonate solution into the first flow path 310 to regulate the pH value of the perfusate.

Capacity Control:

The capacity control aims to maintain a stable volume and a stable osmotic pressure of the perfusate. A side wall of the second container 200 is designed with a liquid level sensor, and sensed information is sent to the control system 450, converted into a total volume of the perfusate in the circulating system of the perfusion device, and displayed on a displayer 420. The bottom portion of the second container 200 is designed with an osmotic pressure sensor, which senses the osmotic pressure of the perfusate and feeds the osmotic pressure back to the control system 450. The liquid injection port 230 of the second container 200 is connected with the liquid supplementing devices for storing 0.9% sodium chloride solution and concentrated 10% sodium chloride solution respectively. The control system 450 analyzes capacity information and osmotic pressure information comprehensively, calculates a total volume and a concentration of a liquid to be supplemented, and feeds the total volume and the concentration back to the liquid supplementing devices. The liquid injection port 230 is opened, so that different volumes of 0.9% sodium chloride and concentrated 10% sodium chloride are mixed and injected into the second container 200 through the liquid injection port 230, thus completing a closed loop of capacity control.

Thermal Imaging and Fluorescence Imaging Control Procedure:

Thermal imaging control: the heat preservation system 260 (a water bath device) maintains the temperature of the perfusate at 34° C. to 36° C. to supply the perfusate to the isolated liver. In addition, the isolated liver is a living organ with an ability of metabolic heat production. Therefore, when microcirculation of each part of the perfused isolated liver is unobstructed, after the isolated liver is shot by a thermal imager, information is sent to the control system 450 for processing and then displayed as a thermal image with uniform temperature on the displayer 420, and the temperature value displayed is maintained at above 34° C. under a normal condition. When a certain segment of the liver suffers from microcirculation vascular thrombosis, foreign body embolism, or microcirculation vasospasm, etc., the segment of the liver may have insufficient perfusate, weakened metabolism, and imaging worse than that of surrounding segments in thermal imaging. After the isolated liver is imaged by the thermal imager, information is sent to the control system 450 for processing, and then displayed as a thermal image with nonuniform temperature on the displayer 420, and a temperature of the hypoperfused segment of the liver is displayed to be lower than 34° C. At the moment, the control system 450 indicates an implementation team to take corresponding measures such as thrombolysis or vasodilation in this stage. When the thermal imaging shows that the whole liver is poor in imaging, and the temperature is generally lower than or equal to 34° C., after the isolated liver is shot and imaged by the thermal imager, information is sent to the control system 450 for processing, and the control system 450 makes a comprehensive judgment according to indexes such as the rates and pressures of the flow supplied for the hepatic artery and the portal vein by the perfusion device. If the flow rate and pressure indexes are reduced at the same time, the system indicates the implementation team to regulate indexes such as circulating supply parameters in time. If the flow rate index is stable or even increased, the system indicates that the whole liver is failed, and the isolated liver has a poor function, and is not suitable for further transplantation.

ICG fluorescence imaging: indocyanine green (ICG) is a common diagnostic drug in clinic, and is mainly used for examining a function and an effective blood flow of the liver. After being injected, the perfusate is immediately combined with plasma proteins, rapidly distributed in blood vessels of the liver with circulation, efficiently and selectively absorbed by liver cells, and then excreted into bile in free form from the liver cells. The liver cells may show green fluorescence by a fluorescence imager after absorbing ICG. If the cell functions of the segments of the liver are not much different, after the liver is shot by the fluorescence imager, information is sent to the control system 450 and displayed as an image with uniform green fluorescence on the displayer 420. If a certain segment of the liver is hypoperfused, after the liver is shot by the fluorescence imager, information is sent to the control system 450 and displayed as an image with nonuniform green fluorescence on the displayer 420. It is indicated that there is microcirculation hypoperfusion in the area with poor fluorescence imaging, or even that the liver cells in the segment are failed, and the implementation team is indicated to take measures for processing.

Temperature Control Procedure:

A temperature sensor is arranged in the second container 200, and the temperature sensor feeds collected temperature information back to the control system 450. Then, the control system 450 sends a processing instruction to the heat preservation system 260 of the second container 200 (namely the water bath device at the bottom portion of the second container) to maintain the temperature of the perfusate at 34° C. to 36° C.

According to the above description, through the ischaemia-free organ perfusion method in the present invention, the organ can be avoided from going through an ischemia period, and an ischemia-reperfusion injury to the organ can be reduced, thus greatly maintaining functions of the isolated organ. In addition, a microenvironment similar to that in vivo can also be provided for the isolated organ. A simulated environment is constructed for the isolated organ, including arranging an environment in the first container 100 to be similar to that of an abdominal cavity, simulating blood gas and blood oxygen regulation of liver and lung, controlling temperature, establishing closed circulation, etc., so that a living environment of the isolated organ in vitro is similar to that in vivo.

Results of Animal Experiments:

A ischaemia-free transplantation device was developed based on the design scheme of the present invention, and used in animal experiments. Experimental scheme and results were as follows.

(I) Experimental Scheme

1. Experimental animals: miniature pigs (with a weight of 25 kg to 35 kg), over 13 months old.

2. Experimental grouping and scheme: 10 pigs were randomly assigned as donors, and 10 pigs were randomly assigned as recipients of liver transplantation. The donors and the recipients were randomly divided into two groups:

Conventional liver transplantation group (CLT) (n=5): livers were acquired by a conventional method, put into a UW solution at 4° C. for cold preservation for 6 hours, and then implanted into the recipients.

Ischemia-free liver transplantation group (IFLT) (n=5): with the aid of the ischaemia-free transplantation device, the isolated livers were preserved by normothermic machine perfusion (NMP) for 6 hours and then implanted into the recipients without interruption of blood flow in the whole process.

(II) Experiment Results

I. The ischaemia-free transplantation device may effectively perfuse the isolated organ, keeping a good function of the organ.

Figure 8:
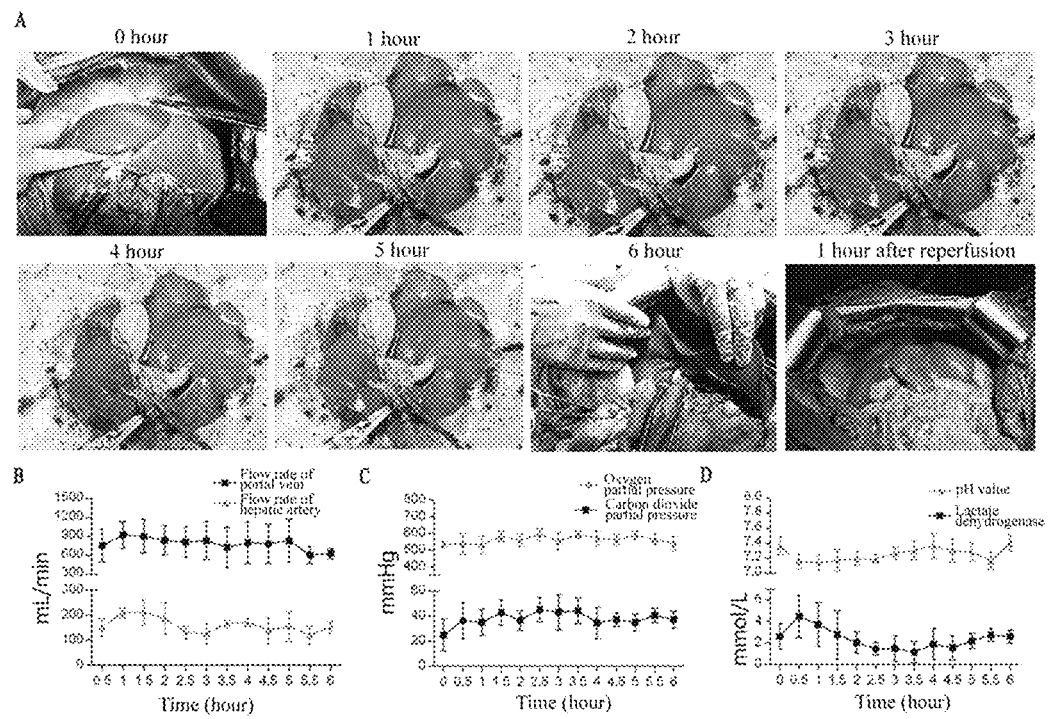
In FIG. 8, A represents a picture of a transplanted liver at different time intervals and the liver subjected to reperfusion for one hour; B represents changes of flow rates of a hepatic artery and a portal vein in different time periods; C represents changes of an oxygen partial pressure and a carbon dioxide partial pressure of a perfusate in different time periods; and D represents changes of a pH value and a lactate level of the perfusate in different time periods.

1. As shown in FIG. 8, A shows pictures of the transplanted liver at different time intervals and the liver subjected to reperfusion for one hour (in A, an upper row includes 0 hour, 1 hour, 2 hours and 3 hours in sequence, and a lower row includes 4 hours, 5 hours and 6 hours, and 1 hour after reperfusion of the liver). During perfusion, the liver was perfused evenly, and had a consistent pink color and a soft texture.

2. As shown in B in FIG. 8 (in B, an upper curve represents a curve of the blood flow rate of the portal vein as a function of time, a lower curve represents a curve of the blood flow rate of the artery as a function of time, with ordinate in mL/min and abscissa as time in hour), the blood flow rates of the artery and the portal vein were both increased one hour before perfusion, and then remained basically stable, with an average blood flow of the artery of 152±20 mL/min and an average blood flow of the portal vein of 630±80 mL/min. At the end of NMP treatment, the average blood flow of the artery was 630±80 mL/min, and the average blood flow of the portal vein was 630±80 mL/min.

3. As shown in C in FIG. 8 (in C, an upper curve represents a curve of an oxygen partial pressure of the perfusate as a function of time, a lower curve represents a curve of a carbon dioxide partial pressure of the perfusate as a function of time, with ordinate in mmHg and abscissa as time in hour), during perfusion, the device was capable of keeping providing sufficient oxygen, and discharging carbon dioxide in the perfusate in time.

4. As shown in D in FIG. 8 (in D, an upper curve represents a curve of a pH value of the perfusate as a function of time with ordinate as the pH value and abscissa as time in hour, and a lower curve represents a curve of a lactate value of the perfusate as a function of time, with ordinate in mmol/L and abscissa as time in hour), generally speaking, the pH value of the perfusate was slightly acidified at the beginning of perfusion, but recovered to a normal range and remained stable within the initial 1.5 hours. The lactate level of the perfusate rapidly reduced from 4.4±1.9 mmol/L to a normal range, reflecting active metabolism of the transplanted liver.

Figure 9:
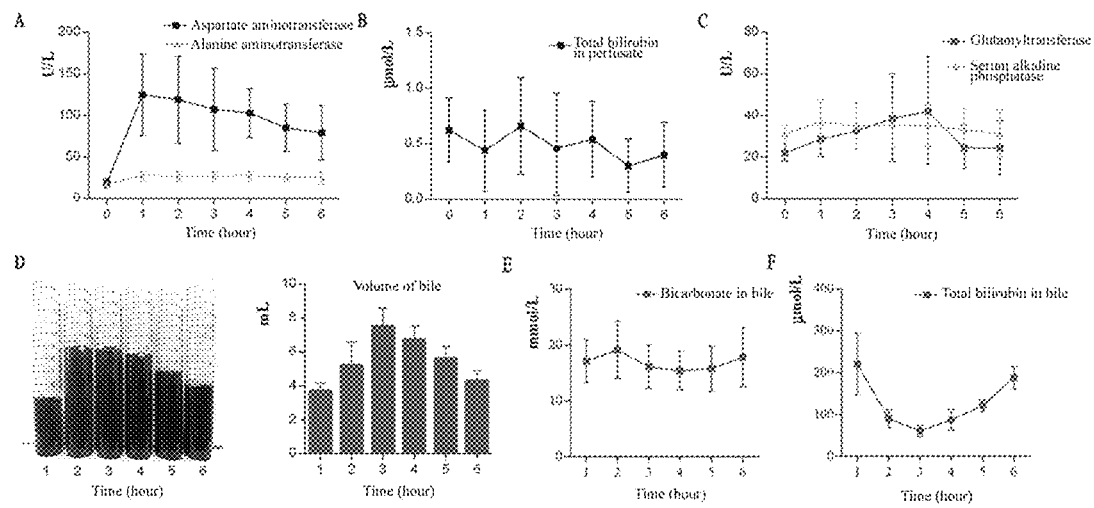
In FIG. 9, A represents changes of AST and ALT of the perfusate in different time periods; B represents changes of total bilirubin of the perfusate in different time periods; C represents changes of GGT and ALP of the perfusate in different time periods; D represents production of bile in different time periods; E represents changes of bicarbonate in the bile in different time periods; and F represents changes of total bilirubin in the bile in different time periods.

5. As shown in A in FIG. 9 (in A, an upper curve represents a curve of AST as a function of time, a lower curve represents a curve of ALT as a function of time, with ordinate in U/L and abscissa as time in hour), a level of serum aspartate aminotransferase (glutamic oxalacetic transaminase or AST) in the perfusate reached a peak value of 124.6±48.9 U/L 1 hour after perfusion, and reduced to 78.8±32.6 U/L at the end of perfusion. A level of alanine aminotransferase (ALT) increased slightly 1 hour after perfusion, but still remained at a stable low level.

6. As shown in B and C in FIG. 9 (B shows a curve of TBIL as a function of time with ordinate in μmol/L and abscissa as time in hour, and C shows curves of glutamyltransferase (-GGT) and serum alkaline phosphatase (ALP) as functions of time with ordinate in U/L and abscissa as time in hour), during perfusion, levels of epithelial cells functional markers (TBIL, ALP and -GGT) in bile also remained at a stable low level.

7. As shown in D in FIG. 9 (production volumes of the bile 1 hour, 2 hours, 3 hours, 4 hours, 5 hours and 6 hours after perfusion are shown from left to right in sequence in D), continuous bile production was observed in the whole process with a peak value of bile production of 7.5±2.4 mL 3 hours after perfusion, wherein the left picture in D shows physical picture of the bile collected in test tubes, and the right picture in D represents a histogram of volumes of the bile.

8. As shown in E and F in FIG. 9 (E shows a curve of bicarbonate (HCO3−) in the bile in different time periods with ordinate in mmol/L and abscissa as time in hour, and F shows changes of total bilirubin in the bile in different time periods with ordinate in μmmol/L and abscissa as time in hour), the levels of TBIL and bicarbonate during perfusion indicated that the bile had a good quality.

II. The ischaemia-free organ transplantation device completely avoids an ischemia-reperfusion injury during transplantation.

Figure 10:
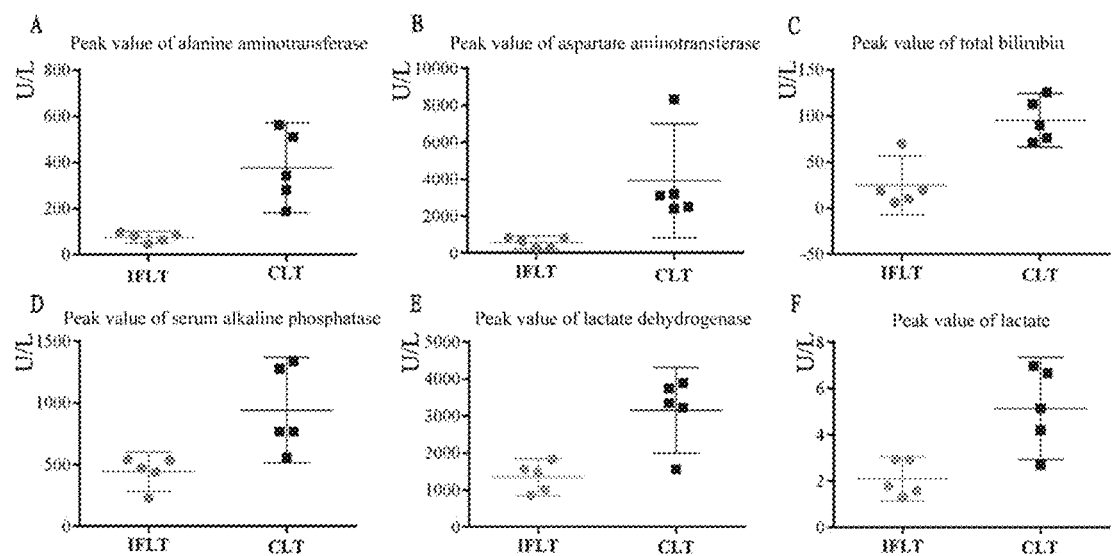
In FIG. 10, A represents comparison of ALT peak values of IFLT group and CLT group; B represents comparison of AST peak values of IFLT group and CLT group; C represents comparison of total bilirubin peak values of IFLT group and CLT group; D represents comparison of ALP peak values of IFLT group and CLT group; E represents comparison of LDH peak values of IFLT group and CLT group; and F represents comparison of lactate peak values of IFLT group and CLT group.

1. As shown in FIG. 10, A shows a comparison diagram of ALT peak values of the IFLT group with that of the CLT group within 7 days after transplantation, wherein the ALT peak value of the IFLT group was 74.8±20.0 U/L, and the ALT peak value of the CLT group was 376.6±157.1 U/L, P=0.002, and B shows a comparison diagram of AST peak values of the IFLT group with that of the CLT group within 7 days after transplantation, wherein the AST peak value of the IFLT group was 567.9±282.9 U/L, and the ALT peak value of the CLT group was 3916.8±2495.6 U/L, P=0.017. In both A and B, the ALT peak value and the AST peak value of the IFLT group were significantly lower than those of the CLT group. C shows a comparison diagram of total bilirubin (TBIL) peak values of the IFLT group with that of the CLT group, wherein the TBIL peak value of the IFLT group was 24.7±25.7 μmol/L, and the TBIL peak value of the CLT group was 95.0±23.3 μmol/L, P=0.001, and D shows a comparison diagram of serum alkaline phosphatase (ALP) peak values of the IFLT group with that of the CLT group, wherein the ALP peak value of the IFLT group was 441.9±128.3 U/L, and the ALP peak value of the CLT group was 942.1±344.5 U/L, P=0.016. E shows a comparison diagram of lactate dehydrogenase (LDH) peak values of the IFLT group with that of the CLT group, wherein the LDH peak value of the IFLT group was 1343.9±398.5 U/L, and the LDH peak value of the CLT group was 3154.0±933.9 U/L, P=0.004. F shows a comparison diagram of lactate peak values of the IFLT group with that of the CLT group in the initial 7 days, wherein the lactate peak value of the IFLT group was 2.1±0.7 mmol/L, and the lactate peak value of the CLT group was 5.1±1.7 mmol/L, P=0.008.

It can be seen from C to E in FIG. 10 that levels of TIBI, ALP and LDH of the IFLT group were significantly lower than those of the conventional transplantation group (CLT group), and the lactate peak value of the IFLT group in the initial 7 days shown in F in FIG. 10 was significantly lower than that of the CLT group.

Figure 11:
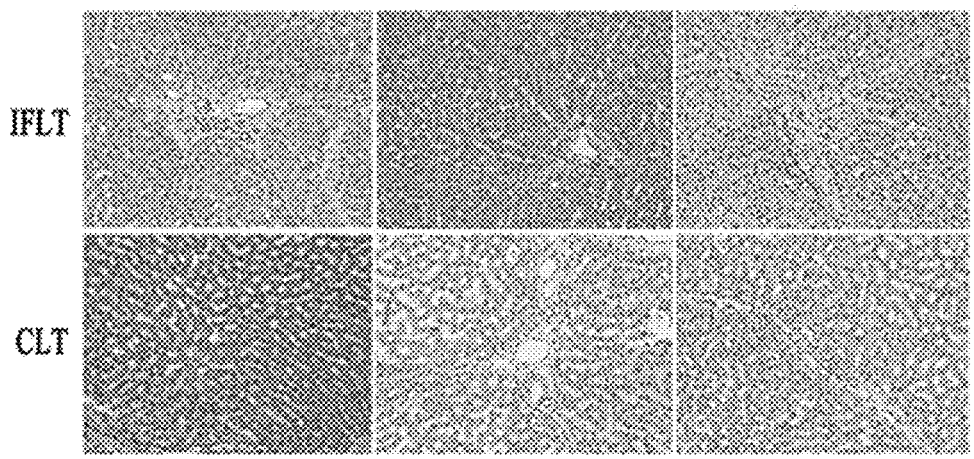
FIG. 11 shows changes of HE staining and cell apoptosis of IFLT group and CLT group; and In FIG. 12, A1 shows liver sinusoidal endothelial cells in a liver pathological section, A2 shows contents of vWF factor in different stages, B shows expression of 1L-1β mRNA in IFLT group and CLT group, C shows expression of IL-6 in IFLT group and CLT group, and D shows expression of TNF-α in IFLT group and CLT group.

2. As shown in FIG. 11, the results of hematoxylin-eosin (HE) staining showed that a liver tissue structure of the IFLT group was complete without obvious congestion and necrosis of hepatic sinusoids. In contrast, extensive congestion of hepatic sinusoids, necrosis of liver cells and extensive extravasation of red blood cells were found in the CLT group after hepatic revascularization.

Figure 12:
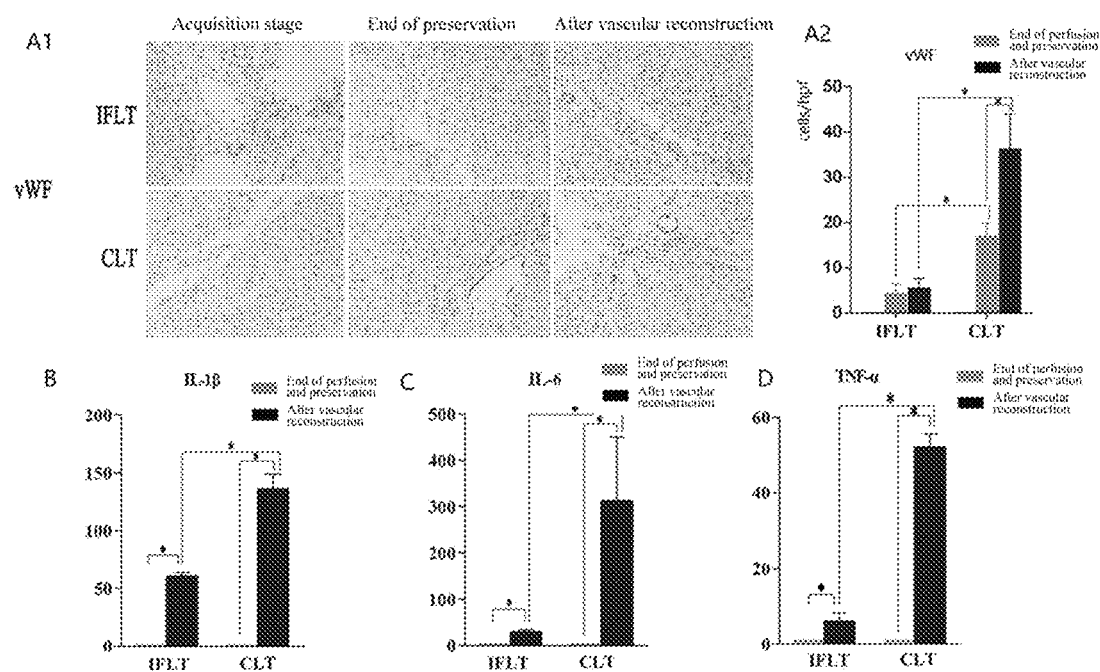

As shown in A1 in FIG. 12, the hepatic sinusoid endothelial cells of the IFLT group were well preserved. As shown in A2, a vWF factor was 1.00±0.82 cells/hpf at the end of NMP (namely the end of perfusion and preservation) and the vWF factor was 7.68±0.82 cells/hpf after vascular reconstruction (only a small number of blood vessels were activated). In the CLT group, a vWF factor was 17.00±2.94 cells/hpf at the end of perfusion and preservation, and the vWF factor was 36.25±2.08 cells/hpf after vascular reconstruction, which was significantly increased. As shown in B, 1L-1β mRNA expression after vascular reconstruction in the CLT group (293.4 163.2 times) was significantly higher than that in the IFLT group (24.0±3.2 times), and the difference between the two groups had no statistical significance (P>0.05). In addition, as shown in C, IL-6 expression in the CLT group (252.4±29.3 times) was significantly higher than that in the IFLT group (115.3±12.5 times). As shown in D, tumor necrosis factor-α (TNF-α) expression in the CLT group (54.5±49.5 times) was significantly higher than that in the IFLT group (7.5±4.4 times).

The above findings indicate that release of a pro-inflammatory cytokine (the vWF factor) in the IFLT group is significantly reduced, and the IFLT group prevents the IRI (ischemia-reperfusion injury) to a large extent.

(III) Experimental Conclusion

The above findings show jointly that: the ischaemia-free transplantation device is useful in avoiding the transplanted organ from suffering from an ischemia injury, ensuring that the organ is always in a normal physiological state, and having better transplantation prognosis compared to traditional technology.

The embodiments of the present invention are described above in detail with reference to the accompanying drawings, but the present invention is not limited to the above embodiments, and various changes may also be made within the knowledge scope of those of ordinary skills in the art without departing from the purpose of the present invention. In addition, the embodiments of the present invention and the features in the embodiments may be combined with each other without conflict.

What is claimed is:

1. An ischaemia-free organ perfusion device, comprising:
    a first container for storing an isolated organ, wherein the first container is provided with a first perfusion port, a second perfusion port and a third perfusion port;
    a second container for recovering blood of an organ in donor acquisition stage and storing perfusate, wherein the second container is provided with a first port and a second port;
    a first flow path, comprising
    a first branch, wherein the first branch is configured for communicating the first perfusion port with the first port, and is provided with a first pump configured for flowing the perfusate from the first port to the first perfusion port, and a second branch, wherein the second branch is configured for communicating the second perfusion port with the first port, and is provided with a second pump configured for flowing the perfusate from the first port to the second perfusion port, a second flow path for communicating the third perfusion port with the second port;

a third flow path for communicating the organ in donor acquisition stage with the first port;

a fourth flow path for communicating the organ in donor acquisition stage with the second port;

a first puncture catheter, wherein one end of the first puncture catheter is configured for connecting with the second perfusion port, and the other end of the first puncture catheter is configured for inserting into an artery of the organ in donor acquisition stage, so that the perfusate is perfused into the artery;

a second puncture catheter, wherein one end of the second puncture catheter is configured for connecting with the first perfusion port, and the other end of the second puncture catheter is configured for inserting into a second vein of the organ in donor acquisition stage, so that the perfusate is perfused into the second vein;

a venipuncture catheter, comprising a venous catheter lumen, wherein in donor acquisition stage, one end of the venous catheter lumen is configured for communicating with the fourth flow path, and the other end of the venous catheter lumen is configured for inserting into a first vein of the organ, so that the blood of the organ is recovered; and an auxiliary catheter lumen, wherein in donor acquisition stage, one end of the auxiliary catheter lumen is configured for communicating with the third flow path, and the other end of the auxiliary catheter lumen is configured for inserting into the first vein of the organ, so that the perfusate is perfused into the first vein;

wherein, in isolation stage, the venipuncture catheter is capable of being cut off and a part of the venipuncture catheter inserted into the first vein is capable of communicating with the third perfusion port, so that the perfusate in the organ is recovered;

wherein, the second container, the third flow path, the fourth flow path and the venipuncture catheter are capable of forming a second circulation with the organ in donor acquisition stage to perfuse the organ in donor acquisition stage and recover the blood of the organ; and after the organ is isolated, the second circulation is capable of being switched to a first circulation formed by the second container, the first flow path, the second flow path, the first puncture catheter, the second puncture catheter, the venipuncture catheter and the isolated organ in the first container to perfuse the isolated organ in preservation stage, and a third pump for providing power to the second circulation;

wherein, uninterrupted blood supply for the transplanted organ during whole organ transplantation is maintained by normothermic machine perfusion.

2. The ischaemia-free organ perfusion device according to claim 1, wherein the first flow path further comprises a third branch for communicating the first branch with the second branch.

3. The ischaemia-free organ perfusion device according to claim 2, further comprising:

an oxygenator arranged in the second branch, and a unidirectional flow regulating valve arranged in the third branch, wherein the unidirectional flow regulating valve is configured for making the perfusate flowing through the oxygenator flow unidirectionally into the first branch through the third branch.

4. The ischaemia-free organ perfusion device according to claim 3, further comprising an organ evaluation system, wherein the organ evaluation system comprises:

a blood gas detection system for detecting blood gas of the perfusate in the first flow path and the second flow path, an imager for capturing image of the organ in the first container, and an organ evaluation computer system for receiving signals from the blood gas detection system and the imager, and evaluating a condition of the isolated organ.

5. The ischaemia-free organ perfusion device according to claim 4, further comprising a control system, wherein the control system is configured for regulating the unidirectional flow regulating valve according to oxygen saturation of the perfusate in the first branch detected by the blood gas detection system.

6. The ischaemia-free organ perfusion device according to claim 4, further comprising:

a secretion collector, a fifth flow path, and a secretion outlet arranged in the first container, wherein the secretion outlet is communicated with the secretion collector through the fifth flow path, and the organ evaluation computer system is capable of analyzing secretion to evaluate the condition of the isolated organ.

7. The ischaemia-free organ perfusion device according to claim 4, further comprising:

a pressure detection assembly arranged in the first branch and the second branch, and a control system, wherein the control system is configured for regulating a flow rate of the first pump according to a perfusion pressure of the first branch and regulating a flow rate of the second pump according to a perfusion pressure of the second branch.

8. The ischaemia-free organ perfusion device according to claim 7, wherein the pressure detection assembly comprises:

a three-way plug valve comprising one end communicated with the corresponding branch of the first flow path, a first detection tube connected with one end of the three-way plug valve, a second detection tube connected with one end of the three-way plug valve, a first pressure sensor for detecting pressure of the first detection tube, and a second pressure sensor for detecting pressure of the second detection tube, wherein a height difference between the first pressure sensor and the corresponding perfusion port is the same as that between the second pressure sensor and the corresponding perfusion port, the three-way plug valve is capable of being switched to a detection state that the first detection tube is communicated with the corresponding branch and the second detection tube is disconnected from the corresponding branch.

9. The ischaemia-free organ perfusion device according to claim 4, further comprising:
   a doser for injecting a medicament into the first flow path, and
   a control system for controlling the doser according to pH value or HCO3− value of the perfusate in the first flow path detected by the blood gas detection system.

10. The ischaemia-free organ perfusion device according to claim 1, further comprising a plurality of lifting columns arranged at a bottom portion of the first container, and the plurality of lifting columns are capable of being lifted in a cross manner.

* * * * *